United States Patent
Dhanda et al.

(10) Patent No.: US 11,627,244 B1
(45) Date of Patent: Apr. 11, 2023

(54) SYNCHRONIZATION OF CAMERA FOCUS MOVEMENT CONTROL WITH FRAME CAPTURE

(71) Applicant: Apple Inc., Cupertino, CA (US)

(72) Inventors: Abhishek Dhanda, San Ramon, CA (US); Gregory Guyomarc'h, San Francisco, CA (US); Michael W. Chin, Belmont, CA (US); Mark N. Gamadia, Cupertino, CA (US); Ling Xiao Wang, Campbell, CA (US)

(73) Assignee: Apple Inc., Cupertino, CA (US)

( * ) Notice: Subject to any disclaimer, the term of this patent is extended or adjusted under 35 U.S.C. 154(b) by 233 days.

(21) Appl. No.: 17/011,804

(22) Filed: Sep. 3, 2020

Related U.S. Application Data

(60) Provisional application No. 62/897,903, filed on Sep. 9, 2019.

(51) Int. Cl.
  *H04N 5/232* (2006.01)
  *H04N 5/04* (2006.01)
  (Continued)

(52) U.S. Cl.
  CPC ......... *H04N 5/232125* (2018.08); *G02B 7/09* (2013.01); *G02B 7/36* (2013.01);
  (Continued)

(58) Field of Classification Search
  CPC .............. H04N 5/232125; H04N 5/04; H04N 5/232127; H04N 5/23245; H04N 5/23287; G02B 7/09; G02B 7/36; G03B 13/36
  See application file for complete search history.

(56) References Cited

U.S. PATENT DOCUMENTS

| 4,218,121 A | 8/1980 | Nakagawa et al. |
| 7,458,738 B2 | 12/2008 | Tomatsu |

(Continued)

FOREIGN PATENT DOCUMENTS

| JP | 2003262788 | 9/2003 |
| JP | 4349302 | 9/2006 |
| JP | 2008092619 | 4/2008 |

*Primary Examiner* — Shahbaz Nazrul
(74) *Attorney, Agent, or Firm* — Robert C. Kowert; Kowert, Hood, Munyon, Rankin & Goetzel, P.C.

(57) ABSTRACT

Various embodiments include synchronization of camera focus movement control with frame capture. In some embodiments, such synchronization may comprise synchronized focus movement control that is based at least in part on integration timing and/or region of interest (ROI) timing. According to some examples, an actuator of a camera module may be controlled such that a lens group and/or an image sensor of the camera module move towards a focus position during one or more time periods (e.g., a non-integration time period in which the image sensor is not being exposed, a non-ROI time period in which a ROI of the image sensor is not being exposed for image capture, and/or a blanking interval, etc.). Additionally, or alternatively, the actuator may be controlled such that the lens group and the image sensor do not move relative to each other in a focus direction during one or more other time periods (e.g., an integration time period in which the image sensor is being exposed, a ROI time period in which the ROI of the image sensor is being exposed, etc.).

20 Claims, 13 Drawing Sheets

(51) Int. Cl.
*G03B 13/36* (2021.01)
*G02B 7/36* (2021.01)
*G02B 7/09* (2021.01)

(52) U.S. Cl.
CPC .............. *G03B 13/36* (2013.01); *H04N 5/04* (2013.01); *H04N 5/23245* (2013.01); *H04N 5/23287* (2013.01); *H04N 5/232127* (2018.08)

(56) References Cited

U.S. PATENT DOCUMENTS

| | | |
|---|---|---|
| 7,634,187 B2 | 12/2009 | Li et al. |
| 7,747,159 B2 | 6/2010 | Uenishi |
| 8,462,216 B2 * | 6/2013 | Sato ..................... H04N 5/2328 348/208.12 |
| 2002/0018140 A1 | 2/2002 | Suemoto et al. |
| 2006/0029384 A1 * | 2/2006 | Tomatsu ................ G03B 19/12 348/E5.037 |
| 2006/0198624 A1 * | 9/2006 | Ono ................. H04N 5/232127 348/E5.045 |
| 2012/0062780 A1 | 3/2012 | Morihisa |
| 2013/0308934 A1 | 11/2013 | Yamanaka |
| 2013/0329106 A1 * | 12/2013 | Bigioi .................. G06V 40/172 348/308 |
| 2016/0112612 A1 * | 4/2016 | Kakkori ................. G03B 13/36 348/373 |
| 2018/0091737 A1 | 3/2018 | Kadambala et al. |
| 2018/0241922 A1 | 8/2018 | Baldwin et al. |

* cited by examiner

SYNCHRONIZATION OF CAMERA FOCUS MOVEMENT CONTROL WITH FRAME CAPTURE

BACKGROUND

This application claims benefit of priority to U.S. Provisional Application No. 62/897,903, filed Sep. 9, 2019, titled "Synchronization of Camera Focus Movement Control with Frame Capture", which is hereby incorporated by reference in its entirety.

TECHNICAL FIELD

This disclosure relates generally to synchronization of camera focus movement control with frame capture.

DESCRIPTION OF THE RELATED ART

The advent of small, mobile multipurpose devices such as smartphones and tablet or pad devices has resulted in a need for high-resolution, small form factor cameras for integration in the devices. Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

BRIEF DESCRIPTION OF THE DRAWINGS

FIG. 2A shows an example synchronization scenario in which focus movement control is based at least in part on frame integration timing. FIGS. 2B-2C show respective example synchronization scenarios in which focus movement control is based at least in part on region of interest (ROI) exposure timing.

Figure 1:
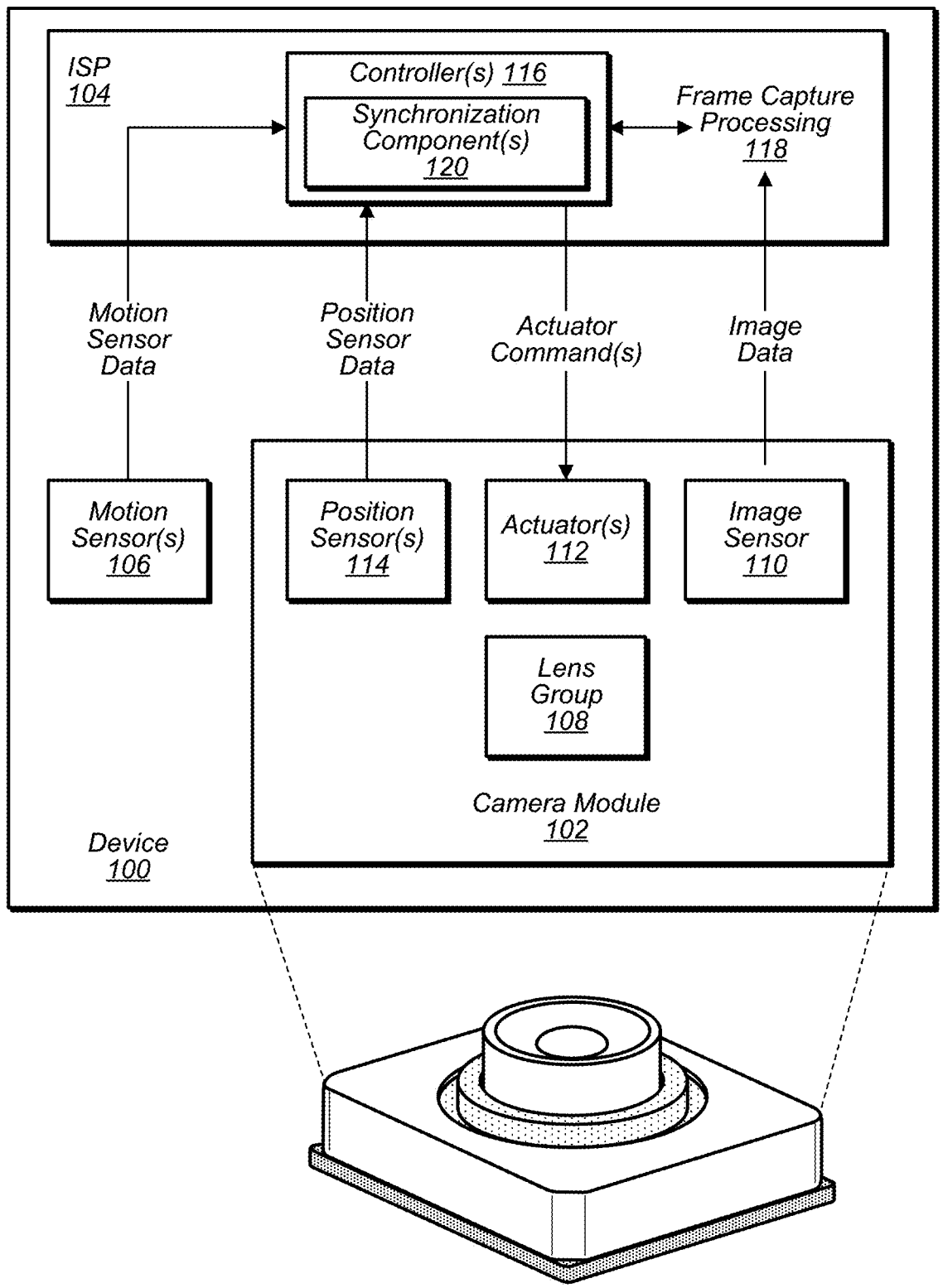
FIG. 1 illustrates a block diagram of example components of a device that may implement synchronization of camera focus movement control with frame capture, in accordance with some embodiments. In various embodiments, a camera module of the device may be operated in a synchronized focus movement control mode.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) (or 35 U.S.C. § 112, sixth paragraph), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to synchronization of camera focus movement control with frame capture. In some embodiments, a camera module may include an actuator for moving a lens group relative to an image sensor and/or for moving the image sensor relative to the lens group. For example, the actuator may cause such movement to focus (e.g., autofocus (AF)) with respect to an image captured via the camera module and/or to stabilize the image (e.g., optical image stabilization (OIS)). According to some embodiments, the actuator may be controlled so that the timing of focus movement is synchronized with the timing of capture of one or more portions of an image frame and/or during blanking intervals between image frames. Additionally, or alternatively, the actuator may be controlled so that no focus movement occurs during capture of one or more portions of an image frame.

According to some implementations, synchronization of camera focus movement control with frame capture may comprise synchronized focus movement control that is based at least in part on a region of interest (ROI) of an image sensor. For example, the actuator may be controlled such that the lens group and/or the image sensor move towards a focus position during one or more non-ROI time periods in which the ROI is not being exposed for image capture. Additionally, or alternatively, the actuator may be controlled such that the lens group and the image sensor do not move relative to each other in a focus direction during one or more ROI time periods in which the ROI is being exposed for image capture. According to various examples, the image sensor "being exposed" means that the image sensor is actively measuring the light incident on the image sensor, and the image sensor "not being exposed" means that the image sensor is not actively measuring the light incident on the image sensor.

In some examples, within capture of each of one or more successive image frames, the focus movement may be similarly controlled to occur during non-ROI time periods and not occur during ROI time periods. In this manner, successive image frames may be used for both focus positioning and high-quality image capture, and may enable reduced focusing times as compared to some other systems in which certain image frames are completely dedicated to gathering focus statistics while holding the lens still, and other frames are completely dedicated to moving the lens towards a desired focus position, e.g., in an alternating frame-by-frame manner, until the desired focus position is reached.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

As mentioned above, various embodiments include synchronization of camera focus movement control with frame capture. FIG. 1 shows a schematic block diagram of example components of a device 100 that may implement such synchronization.

In some embodiments, the device 100 may include a camera module 102, an image signal processor (ISP) 104, and/or one or more motion sensors 106 (e.g., a gyroscope, an accelerometer, etc.). The camera module 102 may include a lens group 108, an image sensor 110, one or more actuators 112 (e.g., a voice coil motor (VCM) actuator) to move the lens 108 and/or the image sensor 110, and/or one or more position sensors 114. The lens group 108 may include one or more lens elements. The image sensor 110 may be configured to capture light that has passed through the lens group 108. In some embodiments, the actuator(s) 112 may be configured to move the lens 108 and/or the image sensor 110 along an optical axis of the camera module 102 to provide zoom and/or focus functionality. In some embodiments, the optical axis may be defined by the lens group 108. According to some embodiments, the optical axis may be defined by the image sensor 110. Additionally, or alternatively, the actuator(s) 112 may be configured to move the lens group 108 and/or the image sensor 110 in directions orthogonal to the optical axis, e.g., to provide OIS functionality.

In some examples, the ISP 104 may include a controller 116 that outputs actuator commands to control the actuator(s) 112 of the camera module 102. The term "controller" may be used herein to refer to one or more controllers and/or one or more processors. In some embodiments, some or all of the functionality of the controller 116 described herein may be performed by one or more other controllers and/or one or more other processors of the device 100 (and/or of the camera module 102).

In some embodiments, to provide OIS functionality, the controller 116 may receive as inputs motion sensor data (e.g., associated with movement of the device 100 and/or the camera module 102) from the motion sensor(s) 106 and/or position sensor data (e.g., associated with OIS positioning of the lens group 108 and/or the image sensor 110) from the position sensor(s) 114. The controller 116 may use the motion sensor data and/or the position sensor data in determining OIS movement control of the actuator(s) 112 such that the lens group 108 and/or the image sensor 110 are moved to a suitable position to compensate for movement of the device 100 and stabilize image capture.

In various embodiments, to provide zoom and/or focus functionality (e.g., AF), the controller 116 may receive as inputs frame capture data (e.g., associated with image frames generated for images captured via the camera module 102) and/or position sensor data (e.g., associated with focus positioning of the lens group 108 and/or the image sensor 110) from the position sensor(s). According to various embodiments, image data from the image sensor 110 may be provided as input to the ISP 104 for frame capture processing 118. The frame capture processing 118 may include generating image frames based at least in part on the image data received from the image sensor 110.

In various embodiments, while the camera module 102 is active (e.g., when the device 100 is in a photography mode), the camera module 102 may continuously capture image frames. According to some examples, these image frames may be used to generate a preview stream on a display (e.g., display 812 in FIG. 8) of the device 100. The image frames may be deleted at some point after they are captured, unless kept for use in creating a captured photo and/or a video. For example, when a user wants to take a photograph, the user may request an image capture (e.g., by pressing on a button or designated portion of a display of the device 100, via voice activation, etc.), and the device 100 may take a number of the image frames for use in an image fusion process to generate a final image. As successive image frames may be used in generation of the final image in some examples, and because at the time of capture it may not be known whether a given frame will be used, it may be desirable to maximize the quality of individual image frames and minimize blur and/or artifacts that may be introduced during the focusing process, e.g., by using synchronized focus movement control techniques described herein.

According to various embodiments, the camera module 102 may be operable in one or more modes. In some embodiments, the camera module 102 may be operable in a mode in which focus movement control is synchronized with frame capture. For example, such a mode may comprise a synchronized focus movement control mode in which focus movement control is based at least in part on frame integration timing (which may also be referred to herein as a "frame integration-based synchronized focus movement control mode") and/or ROI exposure timing (which may also be referred to herein as an "ROI exposure-based synchronized focus movement control mode"). In various embodiments, the controller 116 may include one or more synchronization components 120 configured to enable, at least in part, the synchronized focus movement control functionality described herein. In some non-limiting examples, the synchronization component(s) 120 may include an actuator controller timer that may be used in driving focus movement of the lens group and/or the image sensor 110 via the actuator 112. Furthermore, in some examples, the synchronization component(s) 120 may include a frame capture timer that may be used in driving frame capture.

In some embodiments, when operating the camera module 102 in the synchronized focus movement control mode, the controller 116 may be configured to read data associated with frame capture, and determine (e.g., based on the data) whether a ROI of the image sensor is being captured. Periods of time in which the ROI is not being exposed for image capture may be utilized as opportunities for moving the camera module 102 towards a desired focus position (e.g., in a focus scan), and periods of time in which the ROI is being exposed for image capture may be utilized to maintain a current position (with respect to a focus direction) of the camera module 102. For example, during one or more time periods in which the ROI is not being exposed for image capture, the controller 116 may control the actuator 112 in accordance with one or more focus movement drive signals (e.g., actuator command(s) in FIG. 1) to move the lens group 108 and/or the image sensor 110 towards a focus position (e.g., a target focus position). In some examples, the focus movement drive signal(s) may not require actively moving the lens group 108 and/or the image sensor 110 if the target focus position has already been reached. Furthermore, during one or more time periods in which the ROI is being exposed for image capture, the controller 116 may control the actuator 112 in accordance with one or more position maintenance drive signals (e.g., actuator command(s) in FIG. 1) to hold the lens group 108 and/or the image sensor 110 such that the lens group 108 and the image sensor 110 do not move relative to each other in the focus direction.

In some embodiments, during a time period in which the ROI is being exposed, focus statistics indicating a level of focus of the camera module 102 at a current position may be gathered as the lens group 108 and the image sensor 110 are held in the current position (e.g., without relative movement in the focus direction). The level of focus may be evaluated, e.g., via the ISP 104 to determine whether the camera module 102 has reached the desired focus position. If it is determined that the camera module 102 has not yet reached the desired focus position, then the focus statistics may be used to determine the focus movement drive signal(s) that the controller 116 will use to drive movement towards the focus position in a subsequent time period in which the ROI is not being exposed. In this manner, frame captures of successive image frames may be used to move the camera module 102 towards the focus position, which may enable a reduction in time to focus, e.g., as compared to some other systems that only use every other frame for moving a lens towards a focus position in a focus scan.

The arrangement shown in FIG. 1 is a non-limiting example. It should be understood that the device 100 may have any other suitable arrangement of components in various embodiments. For example, the controller(s) 116 may be included in the camera module 102, such that at least some of the actuator commands are determined in the camera module 102. The arrangement may include information streams between the camera module 102 and the ISP 104. For example, the camera module 102 may receive inputs such as ROI locations from the ISP 104 that may be used in determining the actuator commands.

Figure 2A:
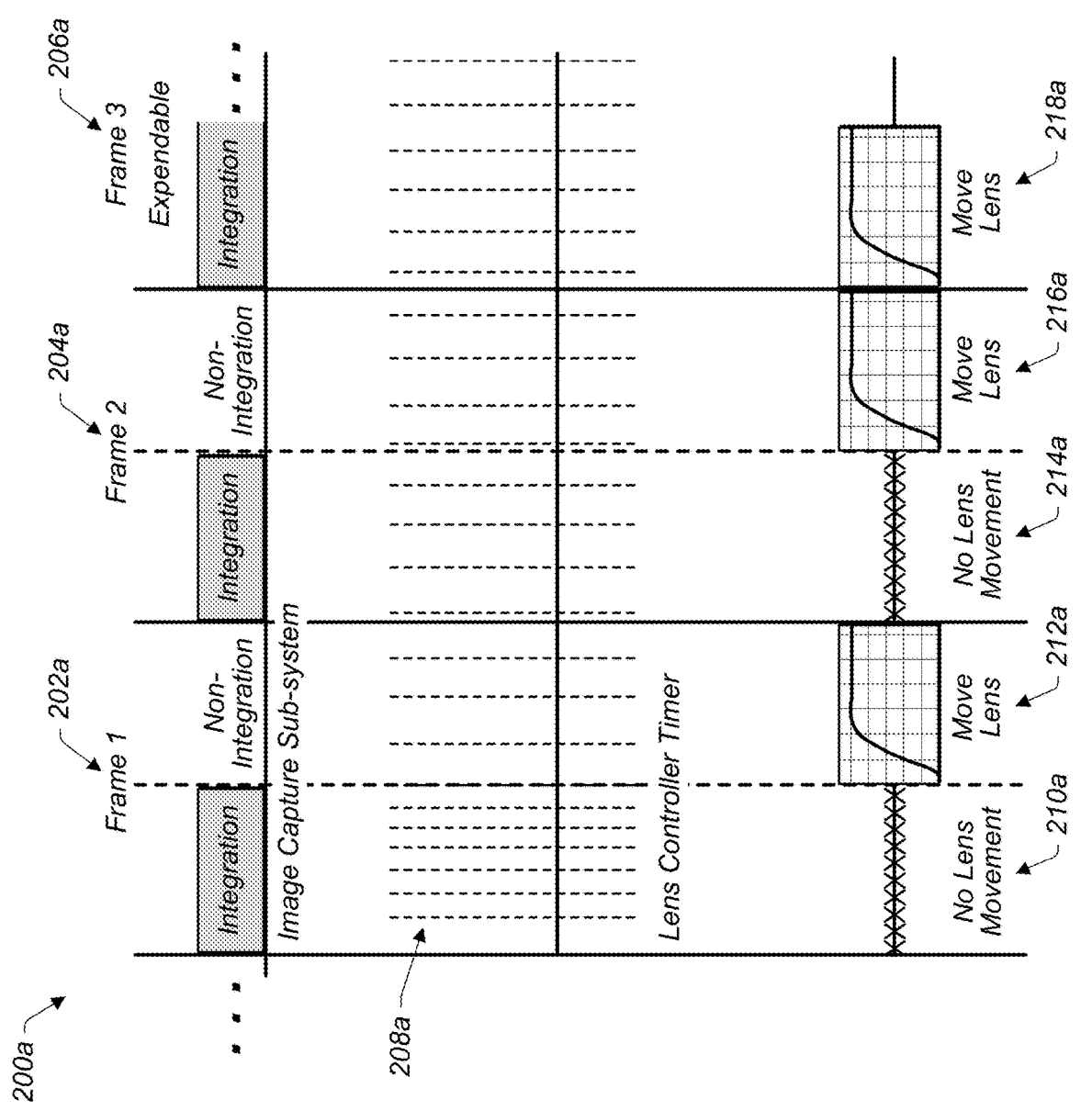
FIGS. 2A-2C illustrate schematic diagrams of example synchronization scenarios in which the timing of lens movement is synchronized with frame capture, in accordance with some embodiments.
Figure 2B:
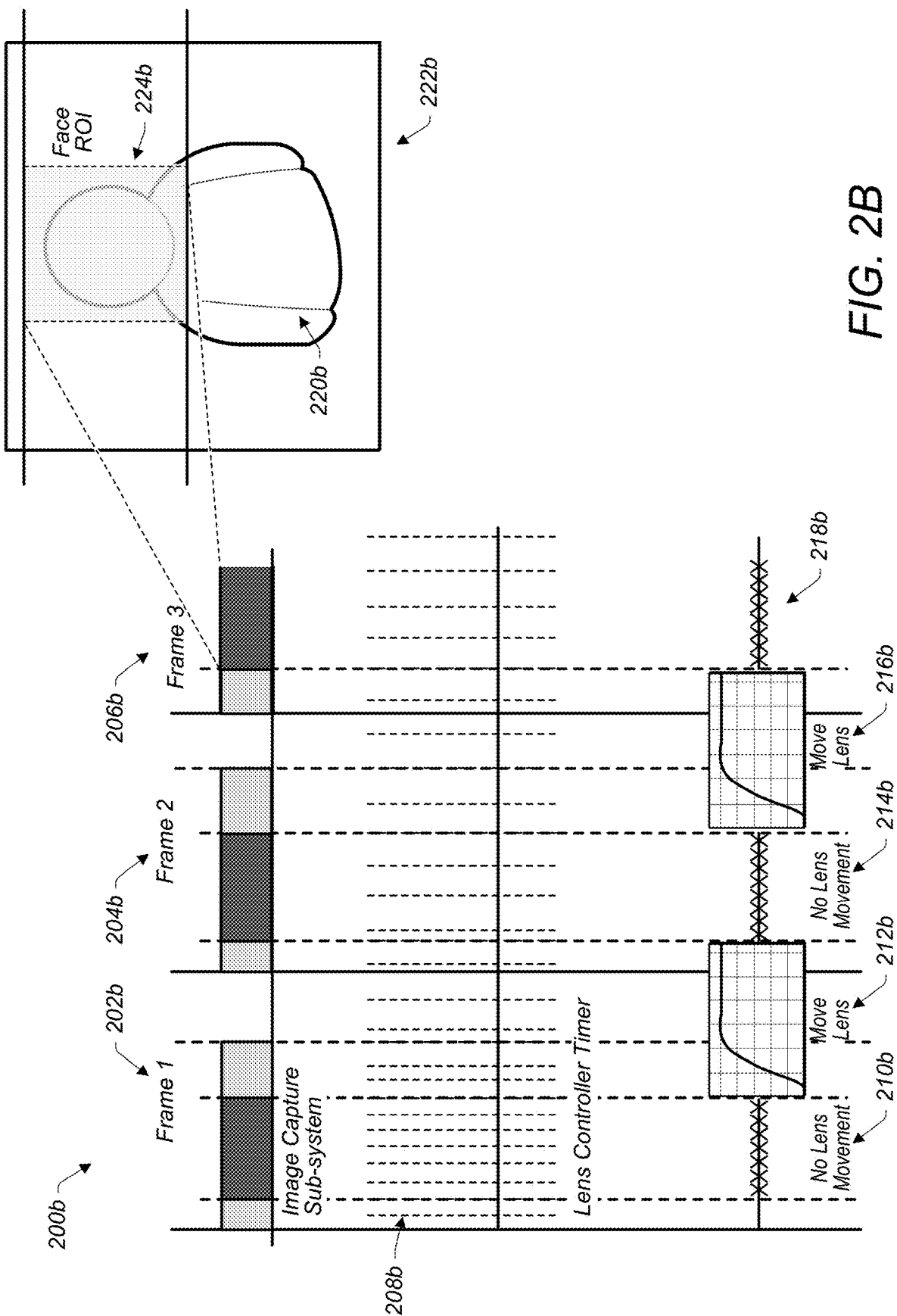
Figure 2C:
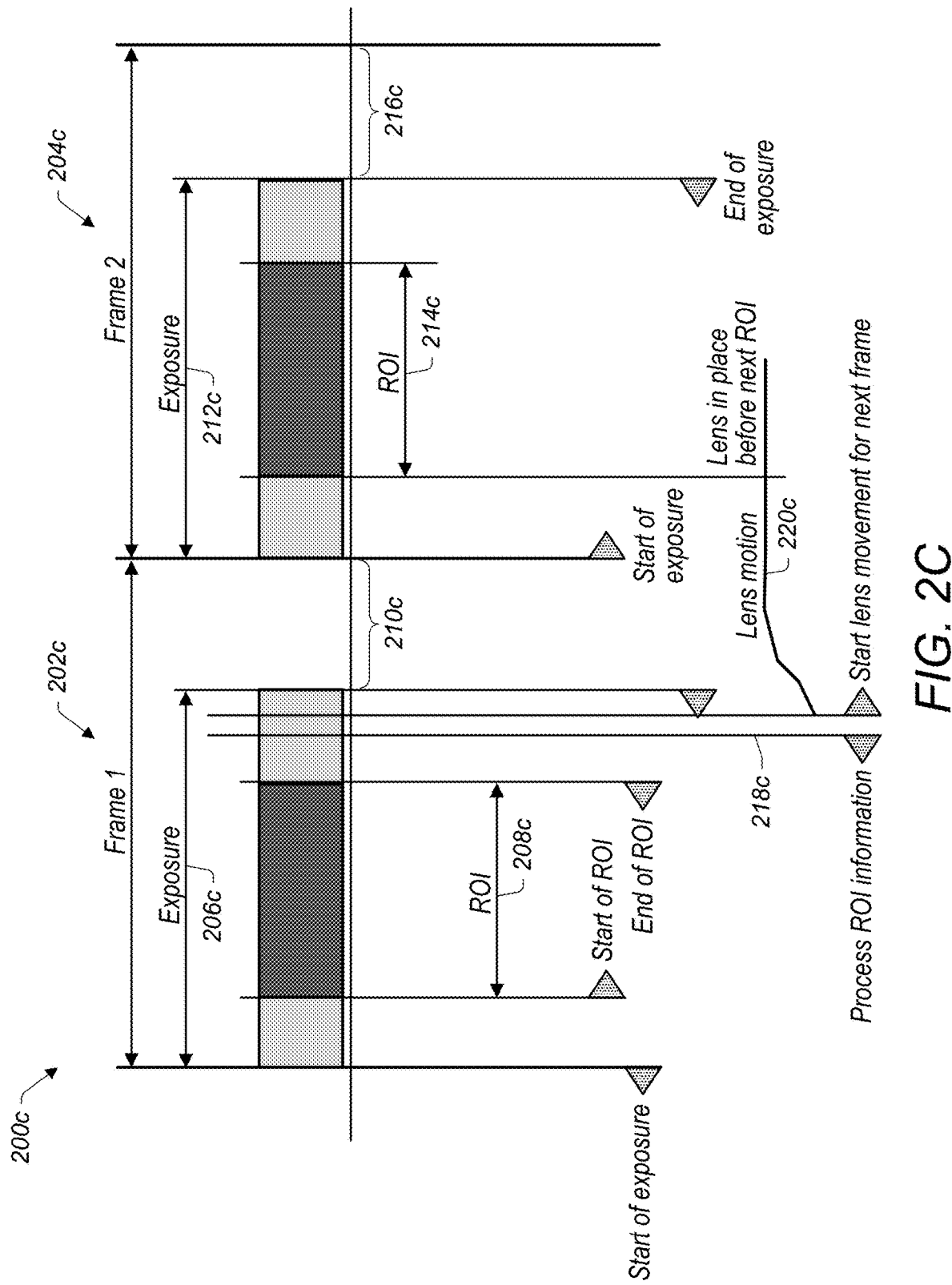

Various embodiments disclosed herein may be described as including a lens group being moved for focus positioning of a camera module. For example, FIGS. 2A-2C illustrate example synchronization scenarios in which the timing of lens movement is synchronized with frame capture. It should be understood, however, that in various embodiments the focus positioning may additionally, or alternatively, include an image sensor being moved for focus positioning of the camera module.

FIG. 2A shows an example synchronization scenario 200a in which focus movement control is based at least in part on frame integration timing, e.g., when operating the camera module in a frame integration-based synchronized focus movement control mode. In some embodiments, the synchronization scenario 200a may include capture, via a camera module (e.g., camera module 102 in FIG. 1), of a first frame 202a, a second frame 204a, and a third frame 206a. For instance, the first frame 202a, the second frame 204a, and the third frame 206a may be successively captured. As indicated in FIG. 2A, each of the first frame 202a, the second frame 204a, and the third frame 206a may include a respective integration portion associated with a respective time period in which an image sensor (e.g., image sensor 110 in FIG. 1) is being exposed for image capture, and a respective non-integration portion associated with a respective time period in which the image sensor is not being exposed for image capture. In various examples, the non-integration portion may be associated with one or more blanking intervals. The dotted lines 208a may represent the timing (e.g., determined based at least in part on a lens controller timer) of drive signals from the controller (e.g., controller 116 in FIG. 1) to provide synchronized focus movement control via the actuator. Note that the drive signal frequency indicated in FIG. 2A is not intended to be drawn to scale, but rather intended to indicate that in various embodiments the drive signal frequency is faster than the frame rate.

During the integration portion of the first frame 202a, the drive signals from the controller may comprise position maintenance drive signals to hold 210a the lens (e.g., lens group 108 in FIG. 1) such that the lens does not move relative to the image sensor in a focus direction (e.g., in a direction parallel to an optical axis of the lens). During the non-integration portion of the first frame 202a, the drive signals from the controller may comprise focus movement drive signals to move 212a the lens towards a focus position.

Similarly, during the integration portion of the second frame 204a, the drive signals from the controller may comprise position maintenance drive signals to hold 214a the lens such that the lens does not move relative to the image sensor in the focus direction. During the non-integration portion of the second frame 204a, the drive signals from the controller may comprise focus movement drive signals to move 216a the lens towards a focus position.

In some embodiments, the synchronization scenario 200a may include one or more "expendable" frames that may be completely dedicated to moving the lens towards a focus position. The third frame 206a is an example of an expendable frame. During the integration and non-integration portions of the third frame 206a, the drive signals from the controller may comprise focus movement drive signals to move 218a the lens towards a focus position.

In various embodiments described herein (e.g., with reference to FIGS. 2A-2C), one or more frames may be designated as expendable based at least in part on device motion. For example, if there is significant device motion and it is determined that earlier frames are not going to be relevant to a later capture request, one or more expendable frames may be designated, e.g., when the motion has settled down. As a non-limiting example, lens motion (from device motion) may be monitored during the lens holding periods (e.g., during exposure of an ROI) and compared to a threshold amount of motion. If the detected motion is above the threshold, one or more frames may be designated as expendable. As another non-limiting example, one or more frames may be designated as expendable if there are a threshold number of frames during which the lens will not be able to achieve the target focus position during the movement periods. Non-linearity of the actuator control may also factor into these calculations, as there may be variation in response for the same step size at different points in the stroke. For example, the response associated with moving from a center position to a position that is 50 um from center in a given direction may be different than the response associated with moving from a position that is 200 um from center to a position that is 250 um from center.

In various examples, depending on one or more factors (e.g., actuator speed, duration of a non-integration time period, and/or target focus position, etc.), it may be desirable to have additional time between frames to move the lens. For example, the system may allow for lens movement during integration, but may be selective so that the lens is not moved during imaging of regions considered to be "important." As such, the system may use analysis of previous frames to designate a region of interest ("ROI") (which may include, e.g., one or more faces and/or one or more objects, etc.), and may preclude lens movement during exposure of that ROI. In some examples, this may result in artifacts introduced by lens movement being limited to occurring outside of the ROI. FIG. 2B shows an example synchronization scenario 200b in which focus movement control is based at least in part on ROI exposure timing, e.g., when operating the camera module in an ROI exposure-based synchronized focus movement control mode.

In some embodiments, the synchronization scenario 200b may include capture, via a camera module (e.g., camera module 102 in FIG. 1), of a first frame 202b, a second frame 204b, and a third frame 206b. For instance, the first frame 202b, the second frame 204b, and the third frame 206b may be successively captured. As indicated in FIG. 2B, each of the first frame 202b, the second frame 204b, and the third frame 206b may include a respective ROI portion associated with a respective time period in which an ROI of an image sensor (e.g., image sensor 110 in FIG. 1) is being exposed, and a respective non-ROI portion associated with a respective time period in which the ROI of the image sensor is not being exposed. In various examples, the non-ROI portion may be associated with one or more non-ROI exposure time periods and/or one or more blanking intervals. The dotted lines 208b may represent the timing (e.g., determined based at least in part on a lens controller timer) of drive signals from the controller (e.g., controller 116 in FIG. 1) to provide synchronized focus movement control via the actuator. Note that the drive signal frequency indicated in FIG. 2B is not intended to be drawn to scale, but rather intended to indicate that in various embodiments the drive signal frequency is faster than the frame rate.

During a ROI portion of the first frame 202b, the drive signals from the controller may comprise position maintenance drive signals to hold 210 the lens (e.g., lens group 108 in FIG. 1) such that the lens does not move relative to the image sensor in a focus direction (e.g., in a direction parallel to an optical axis of the lens). During the non-ROI portion between the ROI portion of the first frame 202b and a ROI portion of the second frame 204b, the drive signals from the controller may comprise focus movement drive signals to move 212b the lens towards a focus position. As indicated in FIG. 2B, the non-ROI portion between the ROI portion of the first frame 202b and the ROI portion of the second frame 204b may comprise, for example: a non-ROI exposure portion of the first frame 202*b*, a blanking interval of the first frame 202*b*, and a non-ROI exposure portion of the second frame 204*b*.

Similarly, during the ROI portion of the second frame 204*b*, the drive signals from the controller may comprise position maintenance drive signals to hold 214*b* the lens such that the lens does not move relative to the image sensor in the focus direction. During the non-ROI portion between the ROI portion of the second frame 204*b* and a ROI portion of the third frame 206*b*, the drive signals from the controller may comprise focus movement drive signals to move 216*b* the lens towards a focus position. As indicated in FIG. 2B, the non-ROI portion between the ROI portion of the second frame 204*b* and the ROI portion of the third frame 206*b* may comprise, for example: a non-ROI exposure portion of the second frame 204*b*, a blanking interval of the second frame 204*b*, and a non-ROI exposure portion of the third frame 206*b*.

During the ROI portion of the third frame 206*b*, the drive signals from the controller may comprise position maintenance drive signals to hold 218*b* the lens such that the lens does not move relative to the image sensor in the focus direction. The synchronization scenario 200*b* may continue in this manner, e.g., with lens movement occurring during the ROI portion(s) and with no lens movement occurring during the non-ROI portion(s) when the camera module is being operated in a synchronized focus movement control mode in accordance with some embodiments.

FIG. 2B also shows an example image 220*b* on an image sensor 222*b*. A box surrounding a face in the image indicates an example of a ROI 224*b* of the image sensor 222*b*. In some non-limiting examples, the face may be associated with the ROI 224*b* based at least in part on a user selection. For example, a user may select the face when the image is being presented to the user via a device display. In some non-limiting examples, object detection may be used to automatically detect (e.g., without requiring a user selection) one or more types of objects (e.g., faces) in images, and the face may be associated with the ROI 224*b* based at least in part on such object detection. According to some examples, areas of the image sensor 222*b* within the ROI 224*b* box may correspond to ROI exposure portions, and areas of the image sensor 222*b* that are not within the ROI 224*b* box may correspond to non-ROI exposure portions. In some embodiments, if an ROI is not detected and/or selected, the camera module may select a default ROI. In these instances, the ROI may be a significant portion of the frame (e.g., 90%).

FIG. 2C shows another example synchronization scenario 200*c* in which focus movement control is based at least in part on ROI exposure timing. In some embodiments, the synchronization scenario 200*c* may include capture, via a camera module (e.g., camera module 102 in FIG. 1), of a first frame 202*c* and a second frame 204*c*. For instance, the first frame 202*c* and the second frame 204*c* may be successively captured.

As indicated in FIG. 2C, the first frame 202*c* may comprise an exposure time period 206*c*. Within the exposure time period 206*c*, the first frame 202*c* may comprise a ROI exposure time period 208*c*. Furthermore, the first frame 202*c* may comprise a blanking interval 210*c* between the end of the exposure time period 206*c* of the first frame 202*c* and the start of an exposure time period 212*c* of the second frame 204*c*. Within the exposure time period 212*c*, the second frame 204*c* may comprise a ROI exposure time period 214*c*. Furthermore, the second frame 204*c* may comprise a blanking interval 216*c* between the end of the exposure time period 212*c* of the second frame 204*c* and the start of an exposure time period (not shown) of the next frame.

In some examples, the synchronization scenario 200*c* may include processing ROI information, e.g., as indicated at 218*c* (between the ROI exposure time period 208*c* of the first frame 202*c* and the blanking interval 210*c* of the first frame 202*c*). In some implementations, the ROI information may be processed in real-time, e.g., as data associated with capture of the first frame 202*c* is being read by a controller (e.g., controller 116 in FIG. 1). The controller may read such data, process the data, and/or determine the ROI based at least in part on the data.

According to various examples, the camera module may be controlled such that the lens is moved towards a focus position during a lens motion time period 220*c*. For example, the controller may determine the lens motion time period 220*c* based at least in part on processing (at 218*c*) the ROI information. In synchronization scenario 200*c*, the lens motion time period 220*c* occurs between the ROI exposure time period 208*c* of the first frame 202*c* and the ROI exposure time period 214*c* of the second frame 204*c*. For example, as indicated in FIG. 2C, the lens motion time period 220*c* may start during a non-ROI exposure time period of the first frame 202*c*, and may continue through at least a portion of the blanking interval 210*c* (between the end of the exposure time period 206*c* of the first frame 202*c* and the start of an exposure time period 212*c* of the second frame 204*c*) and/or at least a portion of a non-ROI exposure time period of the second frame 204*c*. The lens motion time period 220*c* may end before the start of the ROI exposure time period 214*c* of the second frame 204*c*. In some examples, depending on the system requirements, not all of the time outside of the ROI exposure may be needed lens movement, and thus image quality may further be improved by holding the lens in place during a portion of the non-ROI exposure time period (e.g., before the start of an ROI exposure time period).

Figure 3:
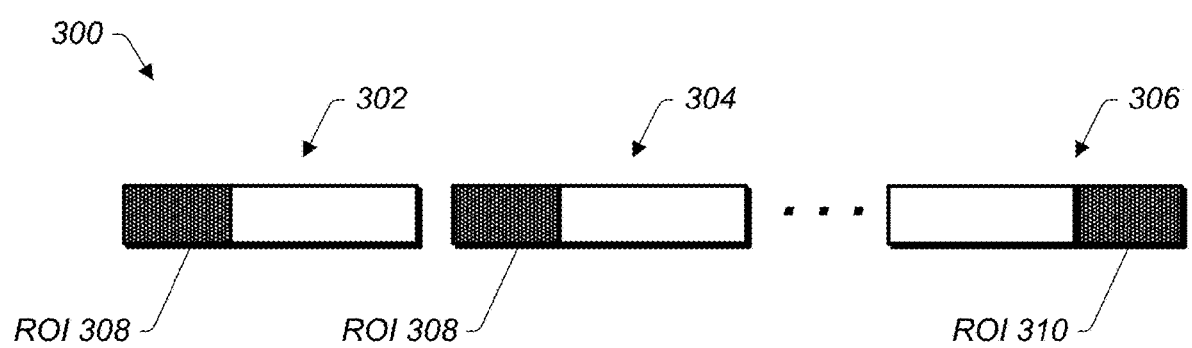
FIG. 3 illustrates a schematic diagram of an example frame capture scenario in which a ROI may change over time, in accordance with some embodiments.

FIG. 3 illustrates a schematic diagram of an example frame capture scenario 300 in which a ROI may change over time. In various embodiments, the frame capture scenario 300 may include capture of multiple frames, including a first frame 302, a second frame 304, and a third frame 306. As indicated in FIG. 3, the ROI of an image sensor may be different at different times. In a non-limiting example, a first ROI 308 may be determined for the image sensor with respect to capture of the first frame 302 and the second frame 304. Furthermore, as indicated in FIG. 3, a second ROI 310 different from the first ROI 308 may be determined for the image sensor with respect to capture of the third frame 306 (e.g., which may occur during a different time period than the capture of the first frame 302 and the second frame 304).

Figure 4:
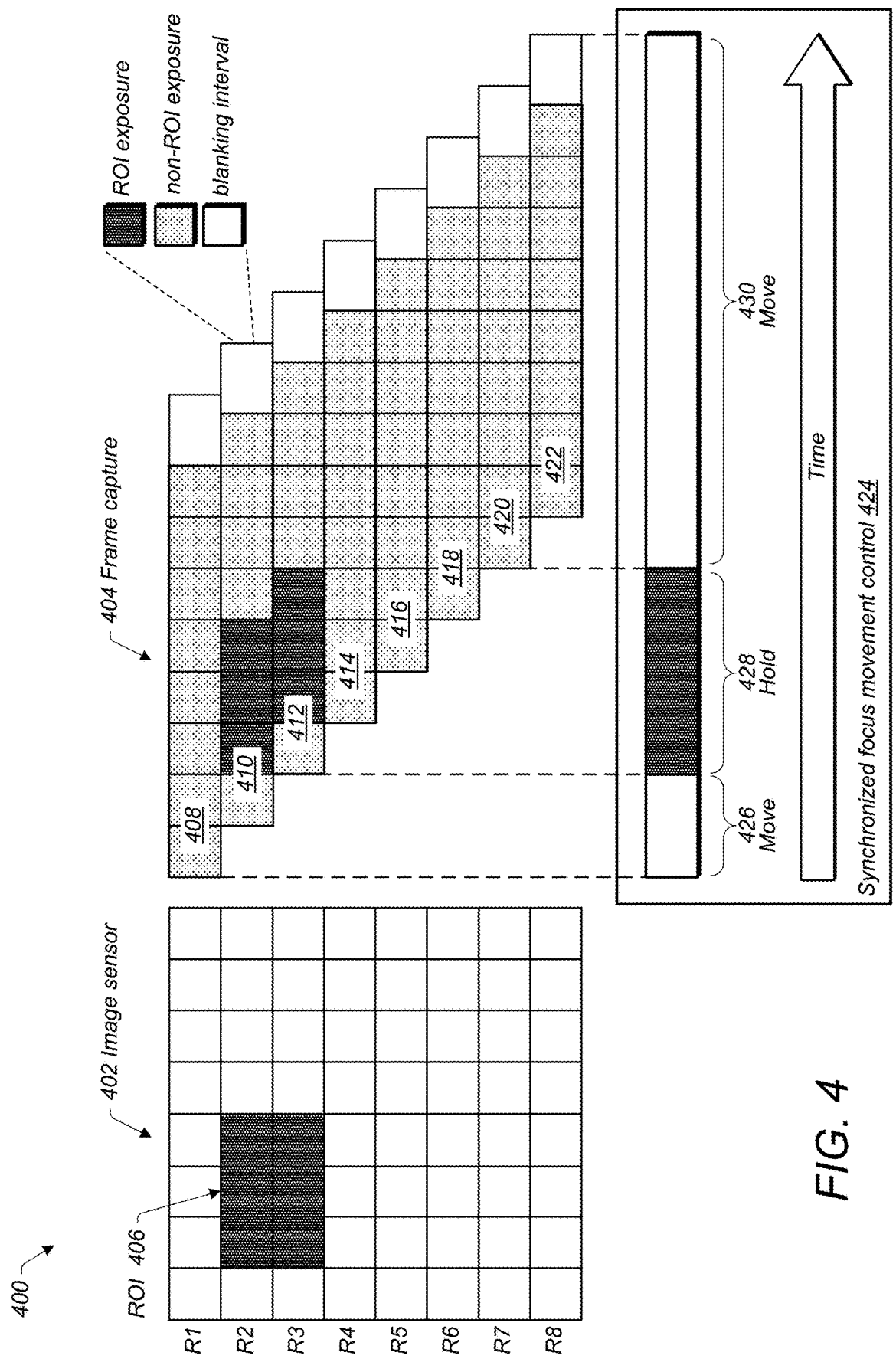
FIG. 4 illustrates a schematic diagram of an example frame capture scenario that includes an example image sensor and an example representation of data associated with a frame capture that includes exposure of a ROI of the image sensor, in accordance with some embodiments.

FIG. 4 illustrates a schematic diagram of an example frame capture scenario 400 that includes an example image sensor 402 and an example representation of data associated with a frame capture 404 that includes exposure of a ROI 406 of the image sensor 402. In a non-limiting example, the image sensor 402 may be exposed in a row-by-row vertical scan (e.g., from R1 to R8) in a rolling shutter capture that generates image data for an image frame. For instance, the image data may comprise line data associated with respective rows of the image sensor 402. In this example, the line data may include: first row line data 408 associated with the first row R1 of pixels of the image sensor 402, second row line data 410 associated with the second row R2 of pixels, third row line data 412 associated with the third row R3 of pixels, fourth row line data 414 associated with the fourth row R4 of pixels, fifth row line data 416 associated with the fifth row R5 of pixels, sixth row line data 418 associated with the sixth row R6 of pixels, seventh row line data 420 associated with the seventh row R7 of pixels, and eighth row line data 422 associated with the eighth row R8 of pixels. In some examples, each row of line data may include data associated with pixel exposure time periods. For example, as indicated in FIG. 4, the pixel exposure time periods of the frame capture 404 may include ROI exposure time periods during which the ROI 406 of the image sensor 402 is being exposed and/or non-ROI exposure time periods during which the ROI 406 is not being exposed. Furthermore, one or more other time periods (e.g. blanking intervals) may be associated with the frame capture 404.

In frame capture scenario 400, the ROI 406 is located within portions of the second row R2 and third row R3 of pixels of the image sensor 402. Surrounding the ROI 406 pixels, in this example, are pixels that may be referred to herein as "non-ROI" pixels. The non-ROI pixels may correspond to one or more regions of the image sensor 402 that are outside of the ROI. In various embodiments, the ROI 406 may change in location, size, and/or shape. For example, the ROI 406 may change from time to time based at least in part on a determination to track (e.g., for focus purposes) a particular object within a scene in the field of view of the camera module. As a non-limiting example, the particular object may be a person's face that may be determined based at least in part on a user selection via a user interface control presented to the user on a device display. In this example, the ROI 406 may change as the person's face moves within the field of view. In some non-limiting examples, one or more processors may be configured to detect, based at least in part on data associated with images captured via the camera module, one or more types of objects in a scene, and determine the ROI 406 based at least in part on the detected objects. In some non-limiting examples, a default location (e.g., a central area of the image sensor 402) may be used as the ROI 406.

FIG. 4 also indicates an example of synchronized focus movement control during a frame capture time period during which the frame capture 404 occurs. The ROI focus movement control 424 may include controlling the actuator so as to move 426 the lens group (and/or image sensor) towards a focus position during a first non-ROI time period. Additionally, or alternatively, the ROI focus movement control 424 may include controlling the actuator so as to hold 428 the lens group and/or the image sensor in a fixed relative position (e.g., so as not to move in a focus direction) during a ROI time period that succeeds the first non-ROI time period. Additionally, or alternatively, the ROI focus movement control 424 may include controlling the actuator so as to move 430 the lens group (and/or the image sensor) towards the focus position during a second non-ROI time period that succeeds the ROI time period. In some examples, the second non-ROI time period may include a non-ROI exposure time period and a blanking interval, e.g., as indicated in FIG. 4.

Figure 5:
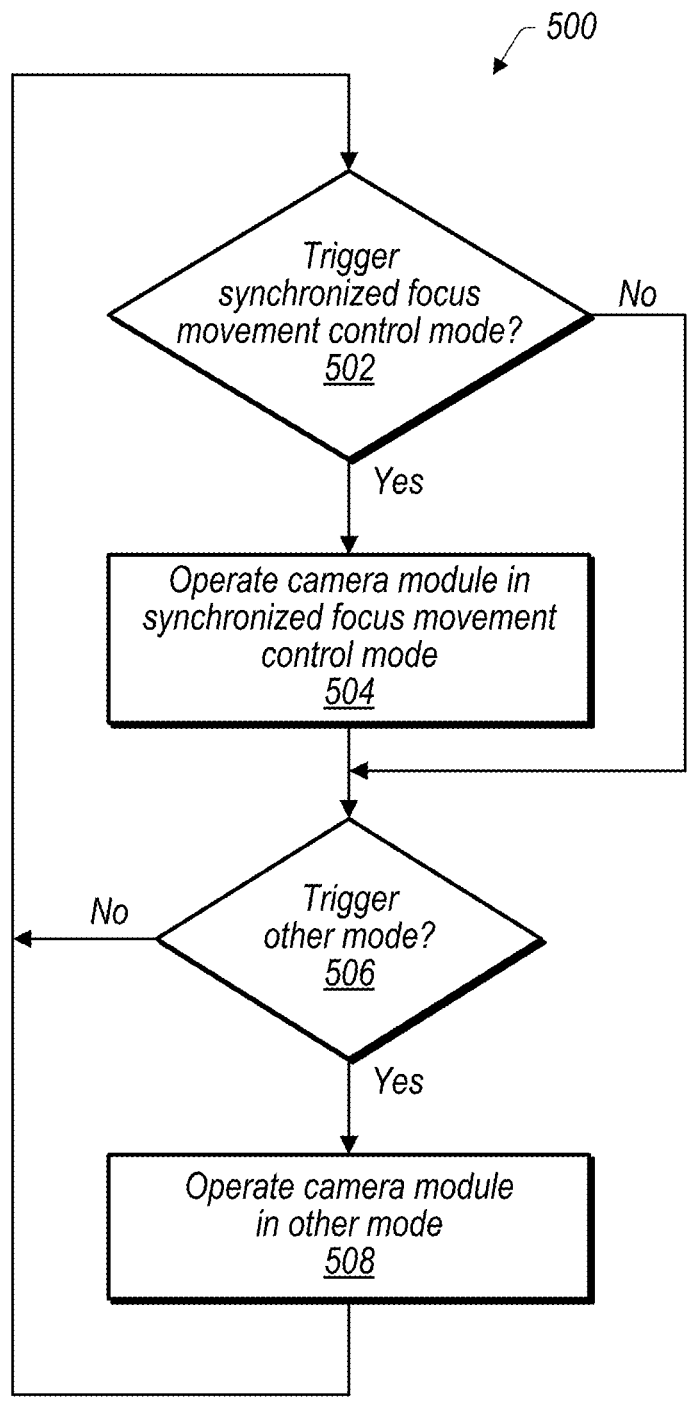
FIG. 5 is a flowchart of an example method of operating a camera module in a synchronized focus movement control mode and/or operating the camera module in one or more other modes, in accordance with some embodiments.

FIG. 5 is a flowchart of an example method 500 of operating a camera module (e.g., camera module 102 in FIG. 1) in a synchronized focus movement control mode and/or operating the camera module in one or more other modes. At 502, the method 500 may include determining whether a synchronized focus movement control mode is triggered, e.g., so as to cause a switch from operating the camera module in one or more currently-enabled modes to operating the camera module in the synchronized focus movement control mode. In some embodiments, the synchronized focus movement control mode may be triggered based at least in part on one or more user selections and/or one or more metrics (e.g., associated with camera behavior, ambient information, etc.). In some non-limiting examples, a controller (e.g., controller 116 in FIG. 1) may switch from operating the camera module in another mode to operating the camera module in the synchronized focus movement control mode in response to a determination to initiate a focus scan comprising a search for a focus position. In some non-limiting examples, the controller may switch from operating the camera module in another mode to operating the camera module in the synchronized focus movement control mode in response to a determination to initiate a video capture.

If, at 502, it is determined that the synchronized focus movement control mode is triggered, then the method 500 may include operating the camera module in the synchronized focus movement control mode, at 504. For example, focus movement control being based at least in part on frame integration timing (e.g., as discussed herein with reference to at least FIGS. 1, 2A, and 6A) and/or ROI exposure timing (e.g., as discussed herein with reference to at least FIGS. 1, 2B-5, and 6B). As discussed in further detail with reference to FIGS. 6A-6B, when operating the camera module in the synchronized focus movement control mode, the controller may be configured to control, during non-integration time period(s) and/or non-ROI time period(s) (in which the ROI is not being exposed for image capture), the actuator in accordance with focus movement drive signal(s) to move the lens group and/or the image sensor towards a focus position. Additionally, or alternatively, the controller may be configured to control, during frame integration time period(s) and/or ROI time period(s) (in which the ROI is being exposed for image capture), the actuator in accordance with position maintenance drive signal(s) to hold the lens group and/or the image sensor such that the lens group and the image sensor do not move relative to each other in a focus direction (e.g., a direction parallel to an optical axis defined by the lens group and/or the image sensor).

If, at 502, it is determined that the synchronized focus movement control mode is not triggered, then the method 500 may include continuing to operate the camera module in the currently-enabled mode(s). Furthermore, the method 500 may continue to evaluate whether the synchronized focus movement control mode is triggered, at 502.

At 506, the method 500 may include determining whether one or more other modes are triggered, e.g., so as to cause a switch from operating the camera module in the synchronized focus movement control mode to operating the camera in the other mode(s). In some embodiments, the other mode(s) may include a mode that is different from the synchronized focus movement control mode and that may be referred to herein as the "other mode." According to some examples, the other mode may be triggered based at least in part on one or more user selections and/or one or more metrics (e.g., associated with camera behavior, ambient information, etc.). In some non-limiting examples, the controller may switch from operating the camera module in the synchronized focus movement control mode to operating the camera module in the other mode in response to a determination to initiate a still image capture.

If, at 506, it is determined that the other mode is not triggered, then the method 500 may include continuing to evaluate whether the synchronized focus movement control mode is triggered, at 502.

If, at 506, it is determined that the other mode is triggered, then the method 500 may include operating the camera module in the other mode, at 508. In a non-limiting example where operating the camera module in the other mode comprises initiating a still image capture, the controller may be configured to control the actuator in accordance with one or more drive signals to hold, throughout a frame capture time period in which an individual image frame is captured (e.g., without regard to frame integration timing and/or ROI exposure timing), the lens group and/or the image sensor such that the lens group and the image sensor do not move relative to each other in the focus direction. In various examples, when operating the camera module in the other mode, the method 500 may include continuing to evaluate whether the synchronized focus movement control mode is triggered, at 502.

Figure 6A:
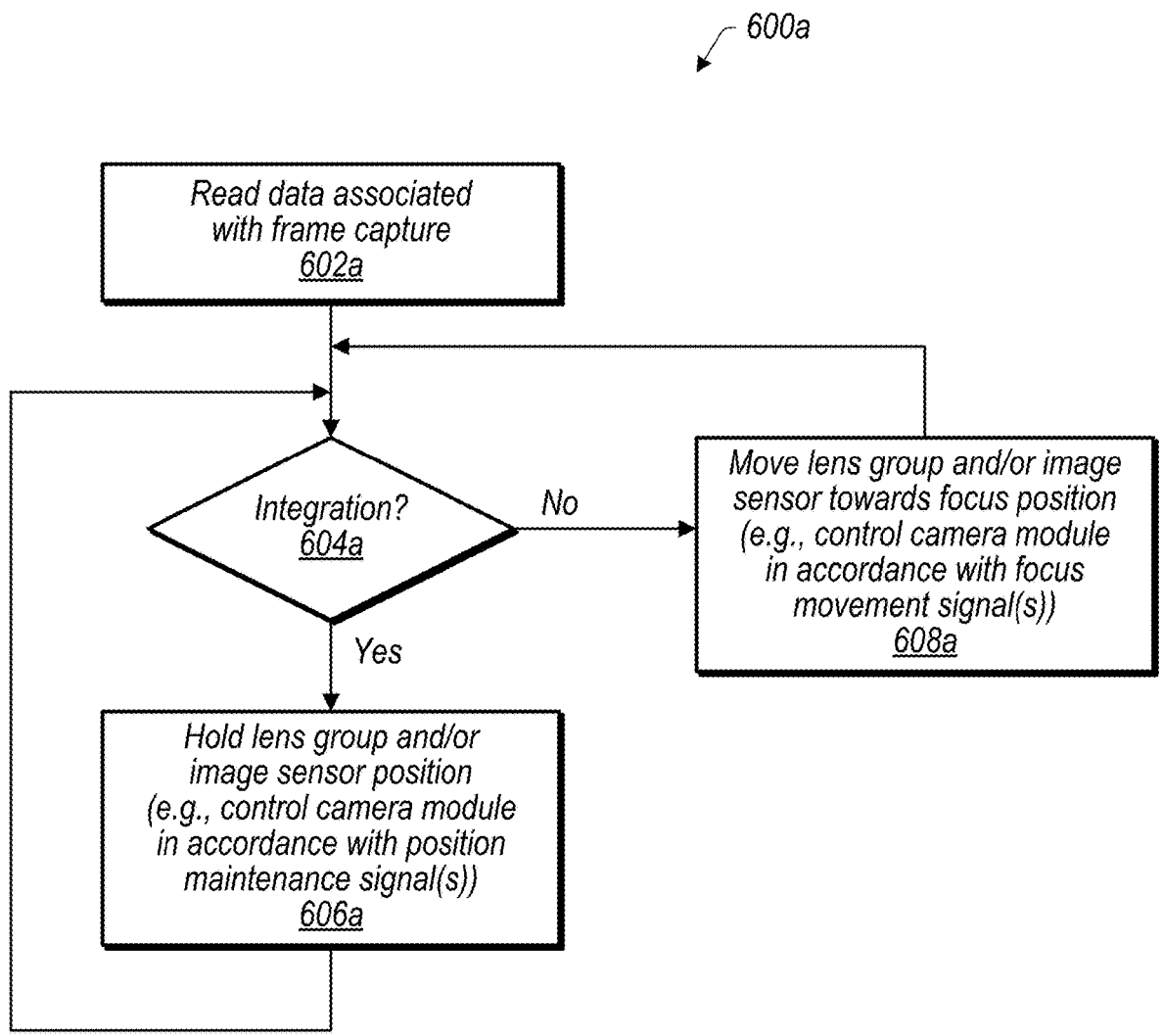
FIGS. 6A-6B are flowcharts of example methods of implementing synchronized focus movement control, in accordance with some embodiments.

FIG. 6A is a flowchart of an example method 600a of implementing synchronized focus movement control that is based at least in part on frame integration timing. At 602a, the method 600a may include reading data associated with frame capture. For example, the data may comprise line data associated with lines of an image frame. In a non-limiting example, a first subset of the line data may be associated with an individual line and may be recorded during a first time period, and a second subset of the line data may be associated with another individual line and may be recorded during a second time period. In this non-limiting example, the controller may read the first subset of the line data before the second subset of the line data is completely recorded.

At 604a, the method 600a may include determining whether the image sensor is being exposed for image capture in an integration time period. For example, the controller may determine whether the image sensor is being exposed based at least in part on the data associated the frame capture, which the controller may read at 602a. In some examples, the controller may determine that the image sensor is not being exposed during one or more non-integration time periods. As a non-limiting example, a non-integration time period may include a time period in which a blanking interval occurs without the image sensor being exposed. Furthermore, the controller may determine that the image sensor is being exposed during one or more integration time periods. In various examples, a frame capture time period in which an individual image frame is captured may be associated with one more integration time periods and/or one or more non-integration time periods.

If, at 604a, it is determined that the image sensor is being exposed (e.g., an integration time period), then the method 600a may include holding a position of the lens group and/or the image sensor, e.g., so as to refrain from moving in a focus direction (e.g., a direction parallel to an optical axis of the camera module), at 606a. In some examples, the controller may be configured to control the actuator in accordance with one or more position maintenance drive signals to hold the lens group and/or the image sensor such that the lens group and/or the image sensor do not move relative to each other in the focus direction. According to some examples, the controller may further be configured to determine, during the integration time period, one or more focus statistics. For example, the focus statistic(s) based at least in part on a portion of the data that is recorded while the lens group and/or the image sensor are held during the integration time period. In various examples, the method 600a may include continuing to evaluate whether the image sensor is being exposed for image capture, at 604a.

If, at 604a, it is determined that the image sensor is not being exposed (e.g., a non-integration time period), then the method 600 may include moving the lens group and/or the image sensor towards a focus position, at 608a. In some examples, the controller may be configured to control the actuator in accordance with one or more focus movement drive signals to move the lens group and/or the image sensor towards a focus position.

According to various examples, the actuator may be driven via drive currents provided to the actuator. As a non-limiting example, the actuator may comprise a VCM actuator having one or more magnets and one or more coils. Drive currents may be provided to the coil(s), and the magnet(s) and coil(s) may magnetically interact to produce Lorentz forces that cause the lens group and/or the image sensor to move. In some examples, the controller may be configured to determine, based at least in part on the focus statistic(s) (e.g., as determined during a preceding integration time period), one or more focus movement drive currents to provide to the actuator (e.g., to the coil(s) of a VCM actuator). To control the actuator in accordance with the one or more focus movement drive signals, the actuator may be configured to transmit, during the non-integration time period (e.g., succeeding a ROI time period in which the focus statistic(s) are determined), at least one focus movement drive signal that is associated with the focus movement drive current(s).

Figure 6B:
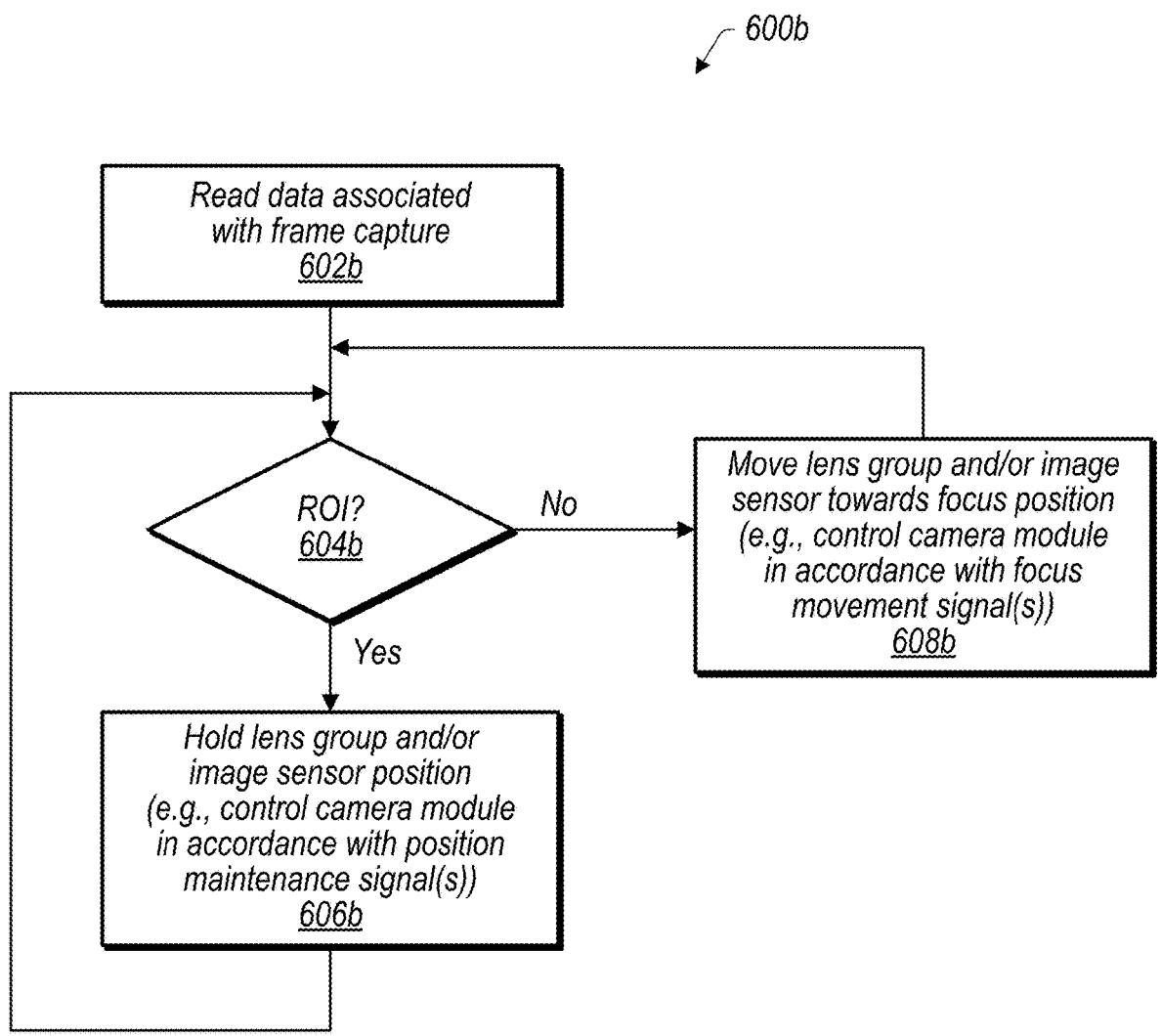

FIG. 6B is a flowchart of an example method 600b of implementing synchronized focus movement control that is based at least in part on ROI exposure timing. At 602b, the method 600b may include reading data associated with frame capture. For example, the data may comprise line data associated with lines of an image frame. In a non-limiting example, a first subset of the line data may be associated with an individual line and may be recorded during a first time period, and a second subset of the line data may be associated with another individual line and may be recorded during a second time period. In this non-limiting example, the controller may read the first subset of the line data before the second subset of the line data is completely recorded.

At 604b, the method 600b may include determining whether a ROI of the image sensor is being exposed for image capture in a ROI time period. For example, the controller may determine whether the ROI is being exposed based at least in part on the data associated the frame capture, which the controller may read at 602b. In some examples, the controller may determine that the ROI is not being exposed during one or more non-ROI time periods. As a non-limiting example, a non-ROI time period may include a time period in which a region of the image sensor that is outside of the ROI (e.g., a non-ROI portion of the image sensor) is exposed without the ROI being exposed. Additionally, or alternatively, a non-ROI time period may include a time period in which a blanking interval occurs without the ROI being exposed. Furthermore, the controller may determine that the ROI is being exposed during one or more ROI time periods. In various examples, a frame capture time period in which an individual image frame is captured may be associated with one or more non-ROI time periods and one or more ROI time periods. In some examples, a non-ROI time period and a ROI time period may be different subsets of the frame capture time period.

If, at 604b, it is determined that the ROI of the image sensor is being exposed (e.g., a ROI time period), then the method 600b may include holding a position of the lens group and/or the image sensor, e.g., so as to refrain from moving in a focus direction (e.g., a direction parallel to an optical axis of the camera module), at 606b. In some examples, the controller may be configured to control the actuator in accordance with one or more position maintenance drive signals to hold the lens group and/or the image sensor such that the lens group and/or the image sensor do not move relative to each other in the focus direction. According to some examples, the controller may further be configured to determine, during the ROI time period, one or more focus statistics. For example, the focus statistic(s) based at least in part on a portion of the data that is recorded while the lens group and/or the image sensor are held during the ROI time period. In various examples, the method 600b may include continuing to evaluate whether the ROI is being exposed for image capture, at 604b.

If, at 604b, it is determined that the ROI of the image sensor is not being exposed (e.g., a non-ROI time period), then the method 600b may include moving the lens group and/or the image sensor towards a focus position, at 608b. In some examples, the controller may be configured to control the actuator in accordance with one or more focus movement drive signals to move the lens group and/or the image sensor towards a focus position.

According to various examples, the actuator may be driven via drive currents provided to the actuator. As a non-limiting example, the actuator may comprise a VCM actuator having one or more magnets and one or more coils. Drive currents may be provided to the coil(s), and the magnet(s) and coil(s) may magnetically interact to produce Lorentz forces that cause the lens group and/or the image sensor to move. In some examples, the controller may be configured to determine, based at least in part on the focus statistic(s) (e.g., as determined during a preceding ROI time period), one or more focus movement drive currents to provide to the actuator (e.g., to the coil(s) of a VCM actuator). To control the actuator in accordance with the one or more focus movement drive signals, the actuator may be configured to transmit, during the non-ROI time period (e.g., succeeding a ROI time period in which the focus statistic(s) are determined), at least one focus movement drive signal that is associated with the focus movement drive current(s).

Figure 7:
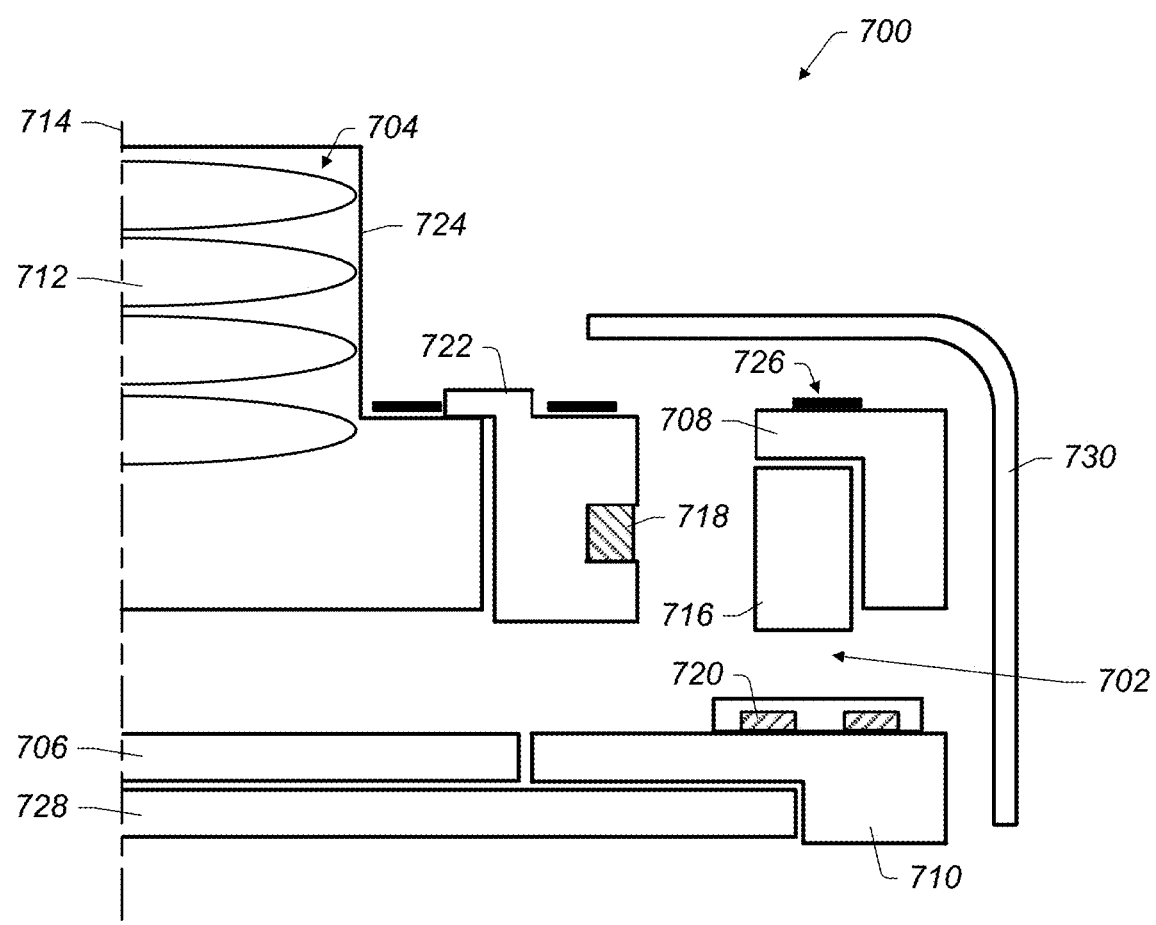
FIG. 7 illustrates a side cross-sectional view of an example camera module that includes an actuator that may be used to implement synchronization of camera focus movement control with frame capture, in accordance with some embodiments.

FIG. 7 illustrates a side cross-sectional view of an example camera module 700 that includes an actuator 702 that may be used to implement synchronization of camera focus movement control with frame capture. According to various embodiments, the camera module 700 may include a lens group 704, an image sensor 706, the actuator 702, a magnet holder 708, and/or a base structure 710. The lens group 704 may include one or more lens elements 712 that define an optical axis 714. The image sensor 706 may be configured to capture light that passes through the lens group 704.

In some embodiments, the actuator 702 may be configured to move the lens group 704 and/or the image sensor 706, e.g., causing relative movement between the lens group 704 and the image sensor 706 to provide autofocus (AF) and/or optical image stabilization (OIS) functionality. For example, the actuator 702 may move the lens group 704 along the optical axis 714 to provide AF of an image on the image sensor 706. Additionally, or alternatively, the actuator 702 may move the lens group 704 in one or more directions orthogonal to the optical axis 714 to provide OIS of an image on the image sensor 706.

In some embodiments, the actuator 702 may comprise one or more voice coil motor (VCM) actuators. For example, the actuator 702 may include one or more magnets 716 and one or more coils (e.g., AF coil(s) 718 and/or OIS coil(s) 720). In some embodiments, the magnet(s) 716 may be attached to the magnet holder 708.

According to some non-limiting embodiments, the AF coil(s) 718 may be attached to a lens carrier 722 and/or a lens barrel 724. The lens carrier 722 may be coupled with the lens barrel 724 in some embodiments. In some embodiments, the lens barrel 724 may hold the lens element(s) 712 of the lens group 704. The AF coil(s) 718 may be disposed proximate the magnet(s) 716 such that the AF coil(s) 718 and the magnet(s) 716 magnetically interact when a current is provided to the AF coil(s) 718 In various embodiments, the magnetic interaction produces a Lorentz force that causes the lens group 704 (e.g., via the lens carrier 722 and/or the lens barrel 724) to move along the optical axis 714 to provide AF functionality.

According to some embodiments, the OIS coil(s) 720 may be coupled with the base structure 710. The OIS coil(s) 720 may be disposed proximate the magnet(s) 716 such that the OIS coil(s) 720 and the magnet(s) 716 magnetically interact when a current is provided to the OIS coil(s) 720. In various embodiments, the magnetic interaction produces a Lorentz force that causes the lens group 704 (e.g., via the magnet holder 708, the lens carrier 722, and/or the lens barrel 724) to move in one or more directions orthogonal to the optical axis 714 to provide OIS functionality.

In various examples, the camera 400 may include one or more suspension arrangements. For example, the camera 400 may include one or more leaf springs 726 in some embodiments. In some embodiments, the leaf spring(s) 726 may be used to suspend the lens carrier 722 from the magnet holder 708.

In some embodiments, the image sensor 706 may be coupled to the base structure 710. As a non-limiting example, the image sensor 706 may be attached to a substrate 728, and the substrate 728 may be attached to the base structure 710. In various embodiments, the image sensor 706, the substrate 728, and/or the base structure 710 may be stationary relative to movement of the lens group 704, the lens barrel 724, the lens carrier 726, and/or the magnet holder 708. Additionally, or alternatively, a stationary structure such as a shield can 730 may encase at least a portion of the camera 700.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 8:
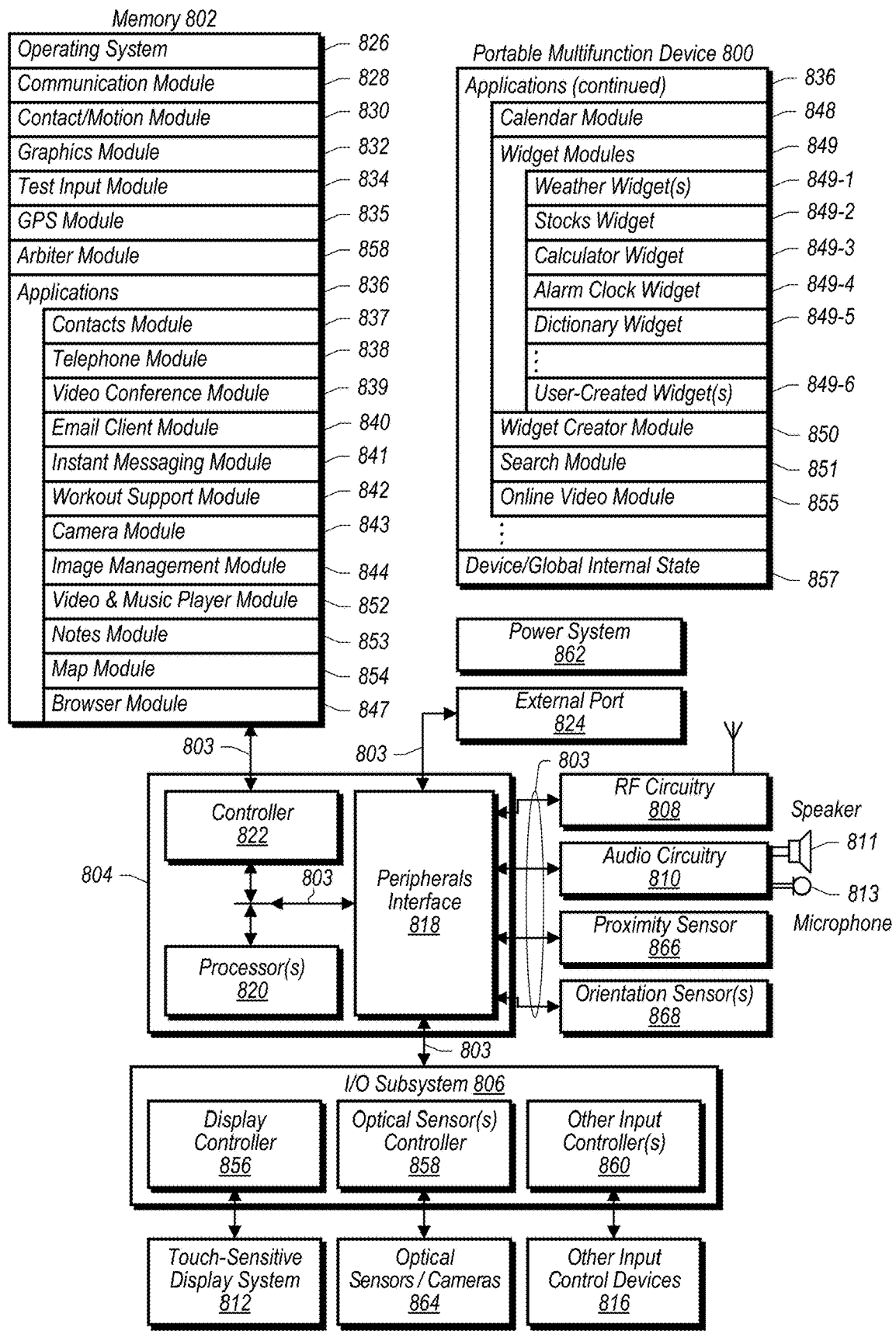
FIG. 8 illustrates a block diagram of a portable multifunction device that may include a camera module and that may implement synchronization of camera focus movement control with frame capture, in accordance with some embodiments.

Attention is now directed toward embodiments of portable devices with cameras. FIG. 8 illustrates a block diagram of an example portable multifunction device 800 that may include a camera module and that may implement synchronization of camera focus movement control with frame capture (e.g., as described above with reference to FIGS. 1-7), according to some embodiments. Cameras 864 are sometimes called "optical sensors" for convenience, and may also be known as or called an optical sensor system. Device 800 may include memory 802 (which may include one or more computer readable storage mediums), memory controller 822, one or more processing units (CPUs) 820, peripherals interface 818, RF circuitry 808, audio circuitry 810, speaker 811, touch-sensitive display system 812, microphone 813, input/output (I/O) subsystem 806, other input or control devices 816, and external port 824. Device 800 may include multiple optical sensors 864. These components may communicate over one or more communication buses or signal lines 803.

It should be appreciated that device 800 is only one example of a portable multifunction device, and that device 800 may have more or fewer components than shown, may combine two or more components, or may have a different configuration or arrangement of the components. The various components shown in FIG. 8 may be implemented in hardware, software, or a combination of hardware and software, including one or more signal processing and/or application specific integrated circuits.

Memory 802 may include high-speed random access memory and may also include non-volatile memory, such as one or more magnetic disk storage devices, flash memory devices, or other non-volatile solid-state memory devices. Access to memory 802 by other components of device 800, such as CPU 820 and the peripherals interface 818, may be controlled by memory controller 822.

Peripherals interface 818 can be used to couple input and output peripherals of the device to CPU 820 and memory 802. The one or more processors 820 run or execute various software programs and/or sets of instructions stored in memory 802 to perform various functions for device 800 and to process data.

In some embodiments, peripherals interface 818, CPU 820, and memory controller 822 may be implemented on a single chip, such as chip 804. In some other embodiments, they may be implemented on separate chips.

RF (radio frequency) circuitry 808 receives and sends RF signals, also called electromagnetic signals. RF circuitry 808 converts electrical signals to/from electromagnetic signals and communicates with communications networks and other communications devices via the electromagnetic signals. RF circuitry 808 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 808 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 810, speaker 811, and microphone 813 provide an audio interface between a user and device 800. Audio circuitry 810 receives audio data from peripherals interface 818, converts the audio data to an electrical signal, and transmits the electrical signal to speaker 811. Speaker 811 converts the electrical signal to human-audible sound waves. Audio circuitry 810 also receives electrical signals converted by microphone 813 from sound waves. Audio circuitry 810 converts the electrical signal to audio data and transmits the audio data to peripherals interface 818 for processing. Audio data may be retrieved from and/or transmitted to memory 802 and/or RF circuitry 808 by peripherals interface 818. In some embodiments, audio circuitry 810 also includes a headset jack (e.g., 912, FIG. 9). The headset jack provides an interface between audio circuitry 810 and removable audio input/output peripherals, such as output-only headphones or a headset with both output (e.g., a headphone for one or both ears) and input (e.g., a microphone).

I/O subsystem 806 couples input/output peripherals on device 800, such as touch screen 812 and other input control devices 816, to peripherals interface 818. I/O subsystem 806 may include display controller 856 and one or more input controllers 860 for other input or control devices. The one or more input controllers 860 receive/send electrical signals from/to other input or control devices 816. The other input control devices 816 may include physical buttons (e.g., push buttons, rocker buttons, etc.), dials, slider switches, joysticks, click wheels, and so forth. In some alternate embodiments, input controller(s) 860 may be coupled to any (or none) of the following: a keyboard, infrared port, USB port, and a pointer device such as a mouse. The one or more buttons (e.g., 908, FIG. 9) may include an up/down button for volume control of speaker 811 and/or microphone 813. The one or more buttons may include a push button (e.g., 906, FIG. 9).

Touch-sensitive display 812 provides an input interface and an output interface between the device and a user. Display controller 856 receives and/or sends electrical signals from/to touch screen 812. Touch screen 812 displays visual output to the user. The visual output may include graphics, text, icons, video, and any combination thereof (collectively termed "graphics"). In some embodiments, some or all of the visual output may correspond to user-interface objects.

Touch screen 812 has a touch-sensitive surface, sensor or set of sensors that accepts input from the user based on haptic and/or tactile contact. Touch screen 812 and display controller 856 (along with any associated modules and/or sets of instructions in memory 802) detect contact (and any movement or breaking of the contact) on touch screen 812 and converts the detected contact into interaction with user-interface objects (e.g., one or more soft keys, icons, web pages or images) that are displayed on touch screen 812. In an example embodiment, a point of contact between touch screen 812 and the user corresponds to a finger of the user.

Touch screen 812 may use LCD (liquid crystal display) technology, LPD (light emitting polymer display) technology, or LED (light emitting diode) technology, although other display technologies may be used in other embodiments. Touch screen 812 and display controller 856 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 812. In an example embodiment, projected mutual capacitance sensing technology is used, such as that found in the iPhone®, iPod Touch®, and iPad® from Apple Inc. of Cupertino, Calif.

Touch screen 812 may have a video resolution in excess of 800 dpi. In some embodiments, the touch screen has a video resolution of approximately 860 dpi. The user may make contact with touch screen 812 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 800 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 812 or an extension of the touch-sensitive surface formed by the touch screen.

Device 800 also includes power system 862 for powering the various components. Power system 862 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 800 may also include one or more optical sensors or cameras 864. FIG. 8 shows an optical sensor 864 coupled to optical sensor controller 858 in I/O subsystem 806. Optical sensor 864 may include charge-coupled device (CCD) or complementary metal-oxide semiconductor (CMOS) phototransistors. Optical sensor 864 receives light from the environment, projected through one or more lens, and converts the light to data representing an image. In conjunction with imaging module 843 (also called a camera module), optical sensor 864 may capture still images or video. In some embodiments, an optical sensor 864 is located on the back of device 800, opposite touch screen display 812 on the front of the device, so that the touch screen display 812 may be used as a viewfinder for still and/or video image acquisition. In some embodiments, another optical sensor is located on the front of the device so that the user's image may be obtained for videoconferencing while the user views the other video conference participants on the touch screen display.

Device 800 may also include one or more proximity sensors 866. FIG. 8 shows proximity sensor 866 coupled to peripherals interface 818. Alternately, proximity sensor 866 may be coupled to input controller 860 in I/O subsystem 806. In some embodiments, the proximity sensor 866 turns off and disables touch screen 812 when the multifunction device 800 is placed near the user's ear (e.g., when the user is making a phone call).

Device 800 includes one or more orientation sensors 868. In some embodiments, the one or more orientation sensors 868 include one or more accelerometers (e.g., one or more linear accelerometers and/or one or more rotational accelerometers). In some embodiments, the one or more orientation sensors 868 include one or more gyroscopes. In some embodiments, the one or more orientation sensors 868 include one or more magnetometers. In some embodiments, the one or more orientation sensors 868 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 800. In some embodiments, the one or more orientation sensors 868 include any combination of orientation/rotation sensors. FIG. 8 shows the one or more orientation sensors 868 coupled to peripherals interface 818. Alternately, the one or more orientation sensors 868 may be coupled to an input controller 860 in I/O subsystem 806. In some embodiments, information is displayed on the touch screen display 812 in a portrait view or a landscape view based on an analysis of data received from the one or more orientation sensors 868.

In some embodiments, the software components stored in memory 802 include operating system 826, communication module (or set of instructions) 828, contact/motion module (or set of instructions) 830, graphics module (or set of instructions) 832, text input module (or set of instructions) 834, Global Positioning System (GPS) module (or set of instructions) 835, arbiter module 858 and applications (or sets of instructions) 836. Furthermore, in some embodiments memory 802 stores device/global internal state 857. Device/global internal state 857 includes one or more of: active application state, indicating which applications, if any, are currently active; display state, indicating what applications, views or other information occupy various regions of touch screen display 812; sensor state, including information obtained from the device's various sensors and input control devices 816; and location information concerning the device's location and/or attitude.

Operating system 826 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 828 facilitates communication with other devices over one or more external ports 824 and also includes various software components for handling data received by RF circuitry 808 and/or external port 824. External port 824 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 830 may detect contact with touch screen 812 (in conjunction with display controller 856) and other touch sensitive devices (e.g., a touchpad or physical click wheel). Contact/motion module 830 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 830 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 830 and display controller 856 detect contact on a touchpad.

Contact/motion module 830 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 832 includes various known software components for rendering and displaying graphics on touch screen 812 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 832 stores data representing graphics to be used. Each graphic may be assigned a corresponding code. Graphics module 832 receives, from applications etc., one or more codes specifying graphics to be displayed along with, if necessary, coordinate data and other graphic property data, and then generates screen image data to output to display controller 856.

Text input module 834, which may be a component of graphics module 832, provides soft keyboards for entering text in various applications (e.g., contacts 837, e-mail 840, IM 841, browser 847, and any other application that needs text input).

GPS module 835 determines the location of the device and provides this information for use in various applications (e.g., to telephone 838 for use in location-based dialing, to camera 843 as picture/video metadata, and to applications that provide location-based services such as weather widgets, local yellow page widgets, and map/navigation widgets).

Applications 836 may include the following modules (or sets of instructions), or a subset or superset thereof:
- contacts module 837 (sometimes called an address book or contact list);
- telephone module 838;
- video conferencing module 839;
- e-mail client module 840;
- instant messaging (IM) module 841;
- workout support module 842;
- camera module 843 for still and/or video images;
- image management module 844;
- browser module 847;
- calendar module 848;
- widget modules 849, which may include one or more of: weather widget 849-1, stocks widget 849-2, calculator widget 849-3, alarm clock widget 849-4, dictionary widget 849-5, and other widgets obtained by the user, as well as user-created widgets 849-6;
- widget creator module 850 for making user-created widgets 849-6;
- search module 851;
- video and music player module 852, which may be made up of a video player module and a music player module;
- notes module 853;
- map module 854; and/or
- online video module 855.

Examples of other applications 836 that may be stored in memory 802 include other word processing applications, other image editing applications, drawing applications, presentation applications, JAVA-enabled applications, encryption, digital rights management, voice recognition, and voice replication.

In conjunction with touch screen 812, display controller 856, contact module 830, graphics module 832, and text input module 834, contacts module 837 may be used to manage an address book or contact list (e.g., stored in application internal state 857), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 838, video conference 839, e-mail 840, or IM 841; and so forth.

In conjunction with RF circuitry 808, audio circuitry 810, speaker 811, microphone 813, touch screen 812, display controller 856, contact module 830, graphics module 832, and text input module 834, telephone module 838 may be used to enter a sequence of characters corresponding to a telephone number, access one or more telephone numbers in address book 837, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 808, audio circuitry 810, speaker 811, microphone 813, touch screen 812, display controller 856, optical sensor 864, optical sensor controller 858, contact module 830, graphics module 832, text input module 834, contact list 837, and telephone module 838, videoconferencing module 839 includes executable instructions to initiate, conduct, and terminate a video conference between a user and one or more other participants in accordance with user instructions.

In conjunction with RF circuitry 808, touch screen 812, display controller 856, contact module 830, graphics module 832, and text input module 834, e-mail client module 840 includes executable instructions to create, send, receive, and manage e-mail in response to user instructions. In conjunction with image management module 844, e-mail client module 840 makes it very easy to create and send e-mails with still or video images taken with camera module 843.

In conjunction with RF circuitry 808, touch screen 812, display controller 856, contact module 830, graphics module 832, and text input module 834, the instant messaging module 841 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 808, touch screen 812, display controller 856, contact module 830, graphics module 832, text input module 834, GPS module 835, map module 854, and music player module 846, workout support module 842 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 812, display controller 856, optical sensor(s) 864, optical sensor controller 858, contact module 830, graphics module 832, and image management module 844, camera module 843 includes executable instructions to capture still images or video (including a video stream) and store them into memory 802, modify characteristics of a still image or video, or delete a still image or video from memory 802.

In conjunction with touch screen 812, display controller 856, contact module 830, graphics module 832, text input module 834, and camera module 843, image management module 844 includes executable instructions to arrange, modify (e.g., edit), or otherwise manipulate, label, delete, present (e.g., in a digital slide show or album), and store still and/or video images.

In conjunction with RF circuitry 808, touch screen 812, display system controller 856, contact module 830, graphics module 832, and text input module 834, browser module 847 includes executable instructions to browse the Internet in accordance with user instructions, including searching, linking to, receiving, and displaying web pages or portions thereof, as well as attachments and other files linked to web pages.

In conjunction with RF circuitry 808, touch screen 812, display system controller 856, contact module 830, graphics module 832, text input module 834, e-mail client module 840, and browser module 847, calendar module 848 includes executable instructions to create, display, modify, and store calendars and data associated with calendars (e.g., calendar entries, to do lists, etc.) in accordance with user instructions.

In conjunction with RF circuitry 808, touch screen 812, display system controller 856, contact module 830, graphics module 832, text input module 834, and browser module 847, widget modules 849 are mini-applications that may be downloaded and used by a user (e.g., weather widget 849-1, stocks widget 849-2, calculator widget 849-3, alarm clock widget 849-4, and dictionary widget 849-5) or created by the user (e.g., user-created widget 849-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 808, touch screen 812, display system controller 856, contact module 830, graphics module 832, text input module 834, and browser module 847, the widget creator module 850 may be used by a user to create widgets (e.g., turning a user-specified portion of a web page into a widget).

In conjunction with touch screen 812, display system controller 856, contact module 830, graphics module 832, and text input module 834, search module 851 includes executable instructions to search for text, music, sound, image, video, and/or other files in memory 802 that match one or more search criteria (e.g., one or more user-specified search terms) in accordance with user instructions.

In conjunction with touch screen 812, display system controller 856, contact module 830, graphics module 832, audio circuitry 810, speaker 811, RF circuitry 808, and browser module 847, video and music player module 852 includes executable instructions that allow the user to download and play back recorded music and other sound files stored in one or more file formats, such as MP3 or AAC files, and executable instructions to display, present or otherwise play back videos (e.g., on touch screen 812 or on an external, connected display via external port 824). In some embodiments, device 800 may include the functionality of an MP3 player.

In conjunction with touch screen 812, display controller 856, contact module 830, graphics module 832, and text input module 834, notes module 853 includes executable instructions to create and manage notes, to do lists, and the like in accordance with user instructions.

In conjunction with RF circuitry 808, touch screen 812, display system controller 856, contact module 830, graphics module 832, text input module 834, GPS module 835, and browser module 847, map module 854 may be used to receive, display, modify, and store maps and data associated with maps (e.g., driving directions; data on stores and other points of interest at or near a particular location; and other location-based data) in accordance with user instructions.

In conjunction with touch screen 812, display system controller 856, contact module 830, graphics module 832, audio circuitry 810, speaker 811, RF circuitry 808, text input module 834, e-mail client module 840, and browser module 847, online video module 855 includes instructions that allow the user to access, browse, receive (e.g., by streaming and/or download), play back (e.g., on the touch screen or on an external, connected display via external port 824), send an e-mail with a link to a particular online video, and otherwise manage online videos in one or more file formats, such as H.264. In some embodiments, instant messaging module 841, rather than e-mail client module 840, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 802 may store a subset of the modules and data structures identified above. Furthermore, memory 802 may store additional modules and data structures not described above.

In some embodiments, device 800 is a device where operation of a predefined set of functions on the device is performed exclusively through a touch screen and/or a touchpad. By using a touch screen and/or a touchpad as the primary input control device for operation of device 800, the number of physical input control devices (such as push buttons, dials, and the like) on device 800 may be reduced.

The predefined set of functions that may be performed exclusively through a touch screen and/or a touchpad include navigation between user interfaces. In some embodiments, the touchpad, when touched by the user, navigates device 800 to a main, home, or root menu from any user interface that may be displayed on device 800. In such embodiments, the touchpad may be referred to as a "menu button." In some other embodiments, the menu button may be a physical push button or other physical input control device instead of a touchpad.

Figure 9:
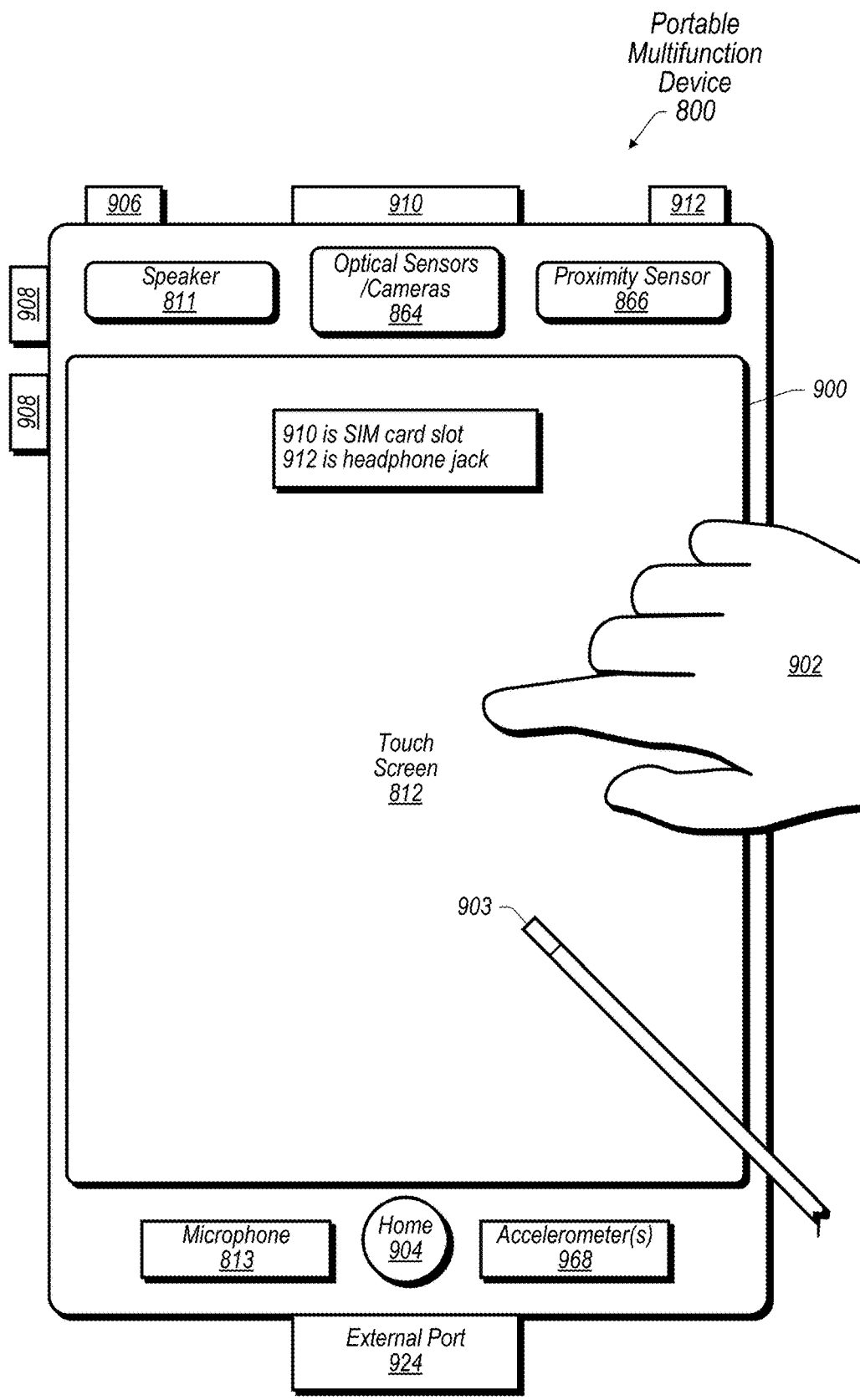
FIG. 9 illustrates a portable multifunction device that may include a camera module and that may implement synchronization of camera focus movement control with frame capture, in accordance with some embodiments.

FIG. 9 depicts illustrates an example portable multifunction device 800 that may include a camera module and that may implement synchronization of camera focus movement control with frame capture (e.g., as described above with reference to FIGS. 1-7), according to some embodiments. The device 800 may have a touch screen 812. The touch screen 812 may display one or more graphics within user interface (UI) 900. In this embodiment, as well as others described below, a user may select one or more of the graphics by making a gesture on the graphics, for example, with one or more fingers 902 (not intended to be drawn to scale in the figure) or one or more styluses 903 (not intended to be drawn to scale in the figure).

Device 800 may also include one or more physical buttons, such as "home" or menu button 904. As described previously, menu button 904 may be used to navigate to any application 836 in a set of applications that may be executed on device 800. Alternatively, in some embodiments, the menu button 904 is implemented as a soft key in a GUI displayed on touch screen 812.

In one embodiment, device 800 includes touch screen 812, menu button 904, push button 906 for powering the device on/off and locking the device, volume adjustment button(s) 908, Subscriber Identity Module (SIM) card slot 910, head set jack 912, and docking/charging external port 924. Push button 906 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 800 also may accept verbal input for activation or deactivation of some functions through microphone 813.

It should be noted that, although many of the examples herein are given with reference to optical sensor(s)/camera(s) 864 (on the front of a device), one or more rear-facing cameras or optical sensors that are pointed opposite from the display may be used instead of, or in addition to, an optical sensor(s)/camera(s) 864 on the front of a device.

Example Computer System

Figure 10:
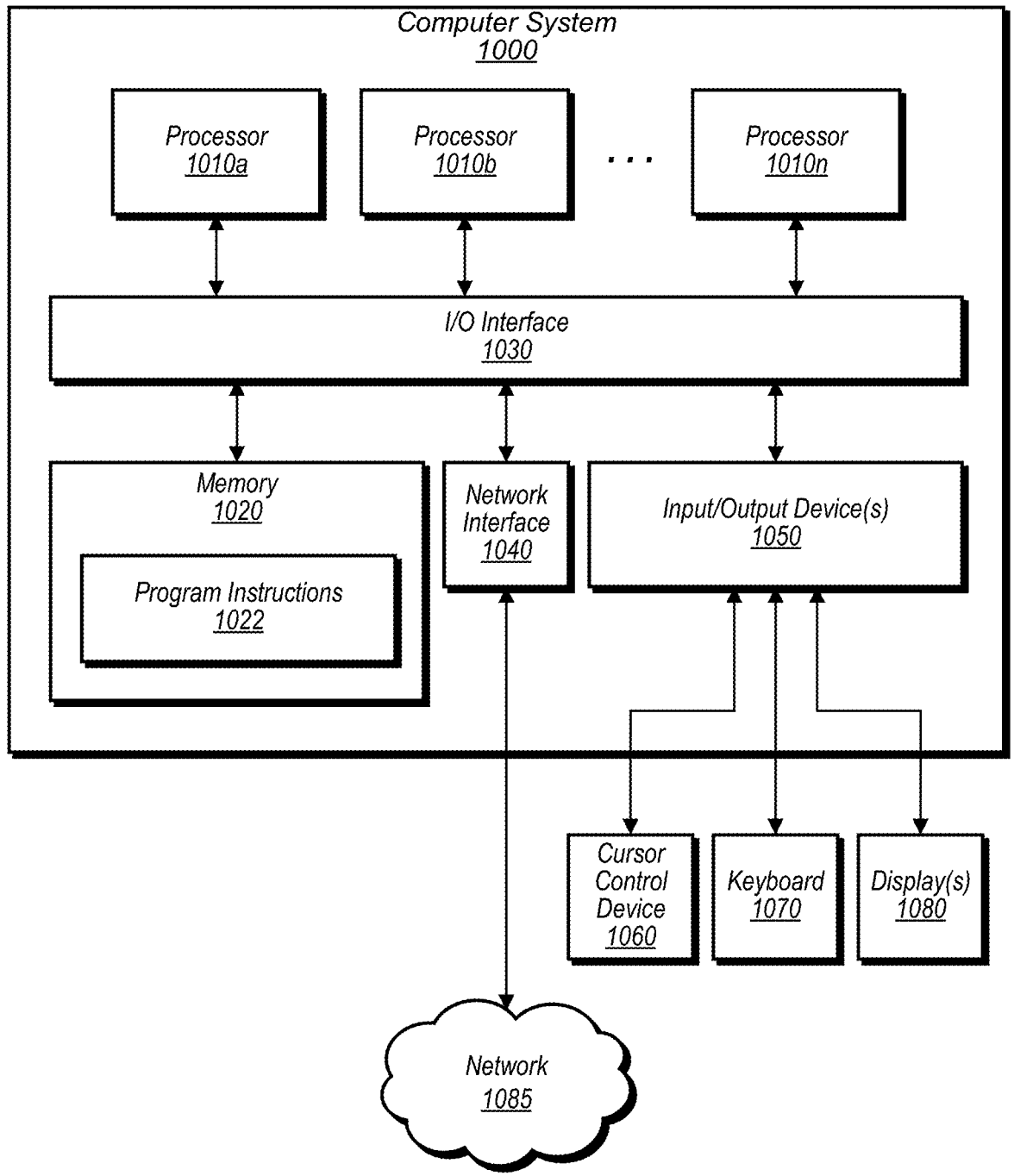
FIG. 10 illustrates an example computer system that may include a camera module and that may implement synchronization of camera focus movement control with frame capture, in accordance with some embodiments.

FIG. 10 illustrates an example computer system 1000 that may include a camera module and that may implement synchronization of camera focus movement control with frame capture (e.g., as described above with reference to FIGS. 1-7), according to some embodiments. The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1000, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store camera control program instructions 1022 and/or camera control data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement a lens control application 1024 incorporating any of the functionality described above. Additionally, existing camera control data 1032 of memory 1020 may include any of the information or data structures described above. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1022, which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

ADDITIONAL DESCRIPTIONS OF EMBODIMENTS (EXAMPLE CLAUSES)

Clause 1: A device, comprising: a camera module, comprising: a lens group comprising one or more lens elements; an image sensor to capture light that has passed through the lens group; and an actuator to move at least one of the lens group or the image sensor in at least a direction parallel to an optical axis of the camera module to provide focus movement for images captured via the camera module; and one or more processors to: operate the camera module in a synchronized focus movement control mode, wherein, to operate the camera module in the synchronized focus movement control mode, the one or more processors are to: control, during at least a portion of a first frame capture time period in which a first image frame is captured, the actuator in accordance with one or more position maintenance drive signals to hold the at least one of the lens group or the image sensor such that the lens group and the image sensor do not move relative to each other in the direction parallel to the optical axis; and control, during at least one of (i) a different portion of the first frame capture time period or (ii) a blanking interval between the first frame capture time period and a second frame capture time period in which a second image frame is captured, the actuator in accordance with one or more focus movement drive signals to move the at least one of the lens group or the image sensor towards a focus position; wherein the first image frame and the second image frame are consecutively captured.

Clause 2: The device of Clause 1, wherein: the one or more processors control the actuator in accordance with the one or more position maintenance drive signals during the first frame capture time period; and the one or more processors control the actuator in accordance with the one or more focus movement drive signals during the blanking interval.

Clause 3: The device of any of Clauses 1 or 2, wherein: the one or more processors control the actuator in accordance with the one or more position maintenance drive signals during a portion of the first frame capture time period; and the one or more processors control the actuator in accordance with the one or more focus movement drive signals during at least a different portion of the first frame capture time period.

Clause 4: The device of Clause 3, wherein: the one or more processors are further to: read data associated with image frame captures; and determine, based at least in part on the data, a region of interest (ROI) time period in which the ROI of the image sensor is being exposed for image capture; the portion of the first frame capture time period comprises: a ROI time period in which a ROI of the image sensor is being exposed for image capture; and the different portion of the first frame capture time period comprises: a non-ROI time period in which the ROI of the image sensor is not being exposed for image capture.

Clause 5: The device of Clause 4, wherein: the data comprises line data associated with lines of the individual image frame, wherein: the ROI time period comprises a first subset of the line data that is associated with an individual line of the lines and is recorded during a first time period; and the non-ROI time period comprises a second subset of the line data that is associated with another individual line of the lines and is recorded during a second time period different than the first time period.

Clause 6: The device of any of Clauses 4 or 5, wherein the one or more processors are further to: determine, during the ROI time period, one or more focus statistics based at least in part on a portion of the data that is recorded while the at least one of the lens group or the image sensor are held such that the lens group and the image sensor do not move relative to each other in the direction parallel to the optical axis.

Clause 7: The device of Clause 6, wherein: the one or more processors are further to: determine, based at least in part on the one or more focus statistics, one or more focus movement drive currents to provide to the actuator; and to control the actuator in accordance with the one or more focus movement drive signals to move the at least one of the lens group or the image sensor towards the focus position, the one or more processors are to: transmit, during a subsequent non-ROI time period that succeeds the ROI time period, at least one focus movement drive signal of the one or more focus movement drive signals, wherein the at least one focus movement drive signal is associated with the one or more focus movement drive currents.

Clause 8: The device of any of Clauses 1-7, wherein the one or more processors are further to: operate the camera module in one or more other modes different from the synchronized focus movement control mode, wherein, to operate the camera module in at least one of the one or more other modes, the one or more processors are to: control the actuator in accordance with one or more drive signals to hold, throughout a frame capture time period in which an individual image frame is captured, the at least one of the lens group or the image sensor such that the lens group and the image sensor do not move relative to each other in the direction parallel to the optical axis.

Clause 9: A system, comprising: a camera module, comprising: a lens group comprising one or more lens elements; an image sensor to capture light that has passed through the lens group; and an actuator to move at least one of the lens group or the image sensor at least in a direction parallel to an optical axis of the camera module to provide focus movement for images captured via the camera module; and a controller to: operate the camera module in a synchronized focus movement control mode in which focus movement control is based at least in part on a region of interest (ROI) of the image sensor, wherein, to operate the camera module in the synchronized focus movement control mode, the controller is to: control, during one or more non-ROI time periods in which the ROI is not being exposed for image capture, the actuator in accordance with one or more focus movement drive signals to move the at least one of the lens group or the image sensor towards a focus position; and control, during one or more ROI time periods in which the ROI is being exposed for image capture, the actuator in accordance with one or more position maintenance drive signals to hold the at least one of the lens group or the image sensor such that the lens group and the image sensor do not move relative to each other in the direction parallel to the optical axis.

Clause 10: The system of Clause 9, wherein the controller is further to: read data associated with image frame captures; determine, based at least in part on the data, a non-ROI time period of the one or more non-ROI time periods; and determine, based at least in part on the data, a ROI time period of the one or more ROI time periods; wherein the non-ROI time period and the ROI time period comprise different subsets of a frame capture time period in which an individual image frame is captured.

Clause 11: The system of any of Clauses 9 or 10, wherein the controller is to: operate the camera module in one or more other modes different from the synchronized focus movement control mode, wherein, to operate the camera module in at least one of the one or more other modes, the one or more processors are to: control the actuator in accordance with one or more drive signals to hold, throughout a frame capture time period in which an individual image frame is captured, the at least one of the lens group or the image sensor such that the lens group and the image sensor do not move relative to each other in the direction parallel to the optical axis.

Clause 12: The system of Clause 11, wherein the controller switches from operating the camera module in the at least one of the one or more other modes to operating the camera module in the synchronized focus movement control mode in response to a determination to initiate a focus scan comprising a search for the focus position.

Clause 13: The system of Clause 11, wherein the controller switches from operating the camera module in the at least one of the one or more other modes to operating the camera module in the synchronized focus movement control mode in response to a determination to initiate a video capture.

Clause 14: The system of Clause 11, wherein the controller switches from operating the camera in the synchronized focus movement control mode to operating the camera module in the at least one of the one or more other modes in response to a determination to initiate a still image capture.

Clause 15: The system of any of Clauses 9-14, wherein: the actuator comprises a voice coil motor (VCM) actuator that includes one or more magnets and one or more coils; the controller is to: read data associated with image frame captures; determine, during the one or more ROI time periods, one or more focus statistics based at least in part on a portion of the data that is recorded while the at least one of the lens group or the image sensor are held such that the lens group and the image sensor do not move relative to each other in the direction parallel to the optical axis; determine, based at least in part on one or more focus statistics, one or more focus movement drive currents to provide to at least one coil of the one or more coils; and to control the actuator in accordance with the one or more focus movement drive signals to move the at least one of the lens group or the image sensor towards the focus position, the controller is to: transmit, during the one or more non-ROI time periods, the one or more focus movement drive signals, wherein the one or more focus movement drive signals are associated with the one or more focus movement drive currents.

Clause 16: The system of any of Clauses 9-15, wherein: to operate the camera module in the synchronized focus movement control mode, the controller is to: determine the ROI of the image sensor; the image sensor comprises a set of pixels; the set of pixels comprises: the ROI, comprising a first group of pixels; and a non-ROI, comprising a second group of pixels; the first group of pixels and the second group of pixels are different subsets of the set of pixels.

Clause 17: The system of any of clauses 9-16, wherein: to control the actuator in accordance with the one or more focus movement drive signals, the controller is to: determine a first non-ROI time period of the one or more non-ROI time periods; determine a second non-ROI time period of the one or more non-ROI time periods; and transmit, during the first non-ROI time period and the second non-ROI time period, focus movement drive signals of the one or more focus movement drive signals; to control the actuator in accordance with the one or more position maintenance drive signals, the one or more processors are to: determine a first ROI time period of the one or more ROI time periods, wherein the first ROI time period and the first non-ROI time period comprise different subsets of a first frame capture time period in which a first image frame is captured; determine a second ROI time period of the one or more ROI time periods, wherein the second ROI time period and the second non-ROI time period comprise different subsets of a second frame capture time period in which a second image frame is captured, and wherein the first image frame and the second image frame are successively captured; and transmit, during the first ROI time period and the second ROI time period, position maintenance drive signals of the one or more position maintenance drive signals.

Clause 18: A method, comprising: implementing a synchronized focus movement control mode of a camera module in which focus movement control is based at least in part on a region of interest (ROI) of an image sensor of the camera module, wherein the implementing the synchronized focus movement control mode comprises: moving, via an actuator of the camera module and during one or more non-ROI time periods in which the ROI is not being exposed for image capture, at least one of a lens group of the camera module or the image sensor towards a focus position, wherein: the lens group comprises one or more lenses; the image sensor is to capture light that has passed through the lens group; and the actuator is to move the image sensor in at least a direction parallel to an optical axis of the camera module to provide focus movement for images captured via the camera module; and holding, via the actuator and during one or more ROI time periods in which the ROI is being exposed for image capture, the at least one of the lens group or the image sensor such that the lens group and the image sensor do not move relative to each other in the direction parallel to the optical axis.

Clause 19: The method of Clause 18, further comprising: determining a first ROI of the image sensor for a first time period; and determining a second ROI of the image sensor for a second time period, wherein the second ROI is different than the first ROI; wherein: during the first time period, the implementing the synchronized focus movement control mode of the camera module comprises: determining, based at least in part on the first ROI, a first non-ROI time period of the one or more non-ROI time periods; and determining, based at least in part on the first ROI, a first ROI time period of the one or more ROI time periods; and during the second time period, the implementing the synchronized focus movement control mode of the camera module comprises: determining, based at least in part on the second ROI, a second non-ROI time period of the one or more non-ROI time periods; and determining, based at least in part on the second ROI, a second ROI time period of the one or more ROI time periods.

Clause 20: The method of any of Clauses 19 or 20, further comprising: implementing one or more other modes different from the synchronized focus movement control mode, wherein implementing at least one of the one or more other modes comprises: holding, throughout a first frame capture time period in which a first image frame is captured, the at least one of the lens group or the image sensor such that the lens group and the image sensor do not move relative to each other in the direction parallel to the optical axis; and holding, throughout a second frame capture time period in which a second image frame is captured, the at least one of the lens group or the image sensor such that the lens group and the image sensor do not move relative to each other in the direction parallel to the optical axis; wherein the first image frame and the second image frame are successively captured.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
a camera module, comprising:
   a lens group comprising one or more lens elements;
   an image sensor to capture light that has passed through the lens group; and
   an actuator to move at least one of the lens group or the image sensor in at least a direction parallel to an optical axis of the camera module to provide focus movement for images captured via the camera module; and
one or more processors to:
   operate the camera module in a synchronized focus movement control mode, wherein, to operate the camera module in the synchronized focus movement control mode, the one or more processors are to:
      control, during at least a portion of a first frame capture time period in which a first image frame is captured, the actuator in accordance with one or more position maintenance drive signals to hold the at least one of the lens group or the image sensor such that the lens group and the image sensor do not move relative to each other in the direction parallel to the optical axis; and
      control, during at least one of (i) a different portion of the first frame capture time period or (ii) a blanking interval between the first frame capture time period and a second frame capture time period in which a second image frame is captured, the actuator in accordance with one or more focus movement drive signals to move the at least one of the lens group or the image sensor towards a focus position for capturing the second image frame;
   wherein the focus position is determined based on the captured first image frame; and
   wherein the first image frame and the second image frame are consecutively captured.

2. The device of claim 1, wherein:
the one or more processors control the actuator in accordance with the one or more position maintenance drive signals during the first frame capture time period; and
the one or more processors control the actuator in accordance with the one or more focus movement drive signals during the blanking interval.

3. The device of claim 1, wherein:
the one or more processors control the actuator in accordance with the one or more position maintenance drive signals during a portion of the first frame capture time period; and
the one or more processors control the actuator in accordance with the one or more focus movement drive signals during at least a different portion of the first frame capture time period.

4. The device of claim 3, wherein:
the one or more processors are further to:
   read data associated with image frame captures; and
   determine, based at least in part on the data, a region of interest (ROI) time period in which the ROI of the image sensor is being exposed for image capture;
the portion of the first frame capture time period comprises:
   a ROI time period in which a ROI of the image sensor is being exposed for image capture; and
the different portion of the first frame capture time period comprises:
   a non-ROI time period in which the ROI of the image sensor is not being exposed for image capture.

5. The device of claim 4, wherein:
the data comprises line data associated with lines of the individual image frame, wherein:
   the ROI time period comprises a first subset of the line data that is associated with an individual line of the lines and is recorded during a first time period; and
   the non-ROI time period comprises a second subset of the line data that is associated with another individual line of the lines and is recorded during a second time period different than the first time period.

6. The device of claim 4, wherein the one or more processors are further to:
   determine, during the ROI time period, one or more focus statistics based at least in part on a portion of the data that is recorded while the at least one of the lens group or the image sensor are held such that the lens group and the image sensor do not move relative to each other in the direction parallel to the optical axis.

7. The device of claim 6, wherein:
the one or more processors are further to:
   determine, based at least in part on the one or more focus statistics, one or more focus movement drive currents to provide to the actuator; and
to control the actuator in accordance with the one or more focus movement drive signals to move the at least one of the lens group or the image sensor towards the focus position, the one or more processors are to:
   transmit, during a subsequent non-ROI time period that succeeds the ROI time period, at least one focus movement drive signal of the one or more focus movement drive signals, wherein the at least one focus movement drive signal is associated with the one or more focus movement drive currents.

8. The device of claim 1, wherein the one or more processors are further to:
operate the camera module in one or more other modes different from the synchronized focus movement control mode, wherein, to operate the camera module in at least one of the one or more other modes, the one or more processors are to:
   control the actuator in accordance with one or more drive signals to hold, throughout a frame capture time period in which an individual image frame is captured, the at least one of the lens group or the image sensor such that the lens group and the image sensor do not move relative to each other in the direction parallel to the optical axis.

9. A system, comprising:
a camera module, comprising:
   a lens group comprising one or more lens elements;
   an image sensor to capture light that has passed through the lens group; and
   an actuator to move at least one of the lens group or the image sensor at least in a direction parallel to an optical axis of the camera module to provide focus movement for images captured via the camera module; and
a controller to:
   operate the camera module in a synchronized focus movement control mode in which focus movement control is based at least in part on a region of interest (ROI) of the image sensor, wherein, to operate the camera module in the synchronized focus movement control mode, the controller is to:
      control, during one or more non-ROI time periods in which the ROI is not being exposed for image capture, the actuator in accordance with one or more focus movement drive signals to move the at least one of the lens group or the image sensor towards a focus position for capturing an image of the ROI, wherein the focus position is determined based on a previous captured image of the ROI; and
      control, during one or more ROI time periods in which the ROI is being exposed for image capture, the actuator in accordance with one or more position maintenance drive signals to hold the at least one of the lens group or the image sensor such that the lens group and the image sensor do not move relative to each other in the direction parallel to the optical axis.

10. The system of claim 9, wherein the controller is further to:
read data associated with image frame captures;
determine, based at least in part on the data, a non-ROI time period of the one or more non-ROI time periods; and
determine, based at least in part on the data, a ROI time period of the one or more ROI time periods;
wherein the non-ROI time period and the ROI time period comprise different subsets of a frame capture time period in which an individual image frame is captured.

11. The system of claim 9, wherein the controller is to:
operate the camera module in one or more other modes different from the synchronized focus movement control mode, wherein, to operate the camera module in at least one of the one or more other modes, the one or more processors are to:
   control the actuator in accordance with one or more drive signals to hold, throughout a frame capture time period in which an individual image frame is captured, the at least one of the lens group or the image sensor such that the lens group and the image sensor do not move relative to each other in the direction parallel to the optical axis.

12. The system of claim 11, wherein the controller switches from operating the camera module in the at least one of the one or more other modes to operating the camera module in the synchronized focus movement control mode in response to a determination to initiate a focus scan comprising a search for the focus position.

13. The system of claim 11, wherein the controller switches from operating the camera module in the at least one of the one or more other modes to operating the camera module in the synchronized focus movement control mode in response to a determination to initiate a video capture.

14. The system of claim 11, wherein the controller switches from operating the camera in the synchronized focus movement control mode to operating the camera module in the at least one of the one or more other modes in response to a determination to initiate a still image capture.

15. The system of claim 9, wherein:
the actuator comprises a voice coil motor (VCM) actuator that includes one or more magnets and one or more coils; and
the controller is to:
   read data associated with image frame captures;
   determine, during the one or more ROI time periods, one or more focus statistics based at least in part on a portion of the data that is recorded while the at least one of the lens group or the image sensor are held such that the lens group and the image sensor do not move relative to each other in the direction parallel to the optical axis; and
   determine, based at least in part on one or more focus statistics, one or more focus movement drive currents to provide to at least one coil of the one or more coils; and
to control the actuator in accordance with the one or more focus movement drive signals to move the at least one of the lens group or the image sensor towards the focus position, the controller is to:
   transmit, during the one or more non-ROI time periods, the one or more focus movement drive signals, wherein the one or more focus movement drive signals are associated with the one or more focus movement drive currents.

16. The system of claim 9, wherein:
to operate the camera module in the synchronized focus movement control mode, the controller is to:
   determine the ROI of the image sensor; the image sensor comprises a set of pixels;
the set of pixels comprises:
   the ROI, comprising a first group of pixels; and
   a non-ROI, comprising a second group of pixels; and
the first group of pixels and the second group of pixels are different subsets of the set of pixels.

17. The system of claim 9, wherein:
to control the actuator in accordance with the one or more focus movement drive signals, the controller is to:
   determine a first non-ROI time period of the one or more non-ROI time periods;
   determine a second non-ROI time period of the one or more non-ROI time periods; and
   transmit, during the first non-ROI time period and the second non-ROI time period, focus movement drive signals of the one or more focus movement drive signals;
to control the actuator in accordance with the one or more position maintenance drive signals, the one or more processors are to:
   determine a first ROI time period of the one or more ROI time periods, wherein the first ROI time period and the first non-ROI time period comprise different subsets of a first frame capture time period in which a first image frame is captured;
   determine a second ROI time period of the one or more ROI time periods, wherein the second ROI time period and the second non-ROI time period comprise different subsets of a second frame capture time period in which a second image frame is captured, and wherein the first image frame and the second image frame are successively captured; and transmit, during the first ROI time period and the second ROI time period, position maintenance drive signals of the one or more position maintenance drive signals.

18. A method, comprising:

implementing a synchronized focus movement control mode of a camera module in which focus movement control is based at least in part on a region of interest (ROI) of an image sensor of the camera module, wherein the implementing the synchronized focus movement control mode comprises:

moving, via an actuator of the camera module and during one or more non-ROI time periods in which the ROI is not being exposed for image capture, at least one of a lens group of the camera module or the image sensor towards a focus position for capturing an image of the ROI, wherein the focus position is determined based on a previous captured image of the ROI, wherein:

the lens group comprises one or more lenses;

the image sensor is to capture light that has passed through the lens group; and the actuator is to move the image sensor in at least a direction parallel to an optical axis of the camera module to provide focus movement for images captured via the camera module; and holding, via the actuator and during one or more ROI time periods in which the ROI is being exposed for image capture, the at least one of the lens group or the image sensor such that the lens group and the image sensor do not move relative to each other in the direction parallel to the optical axis.

19. The method of claim 18, further comprising:

determining a first ROI of the image sensor for a first time period; and determining a second ROI of the image sensor for a second time period, wherein the second ROI is different than the first ROI;

wherein:

during the first time period, the implementing the synchronized focus movement control mode of the camera module comprises: determining, based at least in part on the first ROI, a first non-ROI time period of the one or more non-ROI time periods; and determining, based at least in part on the first ROI, a first ROI time period of the one or more ROI time periods; and during the second time period, the implementing the synchronized focus movement control mode of the camera module comprises:

determining, based at least in part on the second ROI, a second non-ROI time period of the one or more non-ROI time periods; and determining, based at least in part on the second ROI, a second ROI time period of the one or more ROI time periods.

20. The method of claim 18, further comprising:

implementing one or more other modes different from the synchronized focus movement control mode, wherein implementing at least one of the one or more other modes comprises:

holding, throughout a first frame capture time period in which a first image frame is captured, the at least one of the lens group or the image sensor such that the lens group and the image sensor do not move relative to each other in the direction parallel to the optical axis; and holding, throughout a second frame capture time period in which a second image frame is captured, the at least one of the lens group or the image sensor such that the lens group and the image sensor do not move relative to each other in the direction parallel to the optical axis;

wherein the first image frame and the second image frame are successively captured.

* * * * *